United States Patent
Breton et al.

(10) Patent No.: US 7,459,014 B2
(45) Date of Patent: Dec. 2, 2008

(54) RADIATION CURABLE INKS CONTAINING CURABLE GELATOR ADDITIVES

(75) Inventors: Marcel P. Breton, Mississauga (CA); Peter G. Odell, Mississauga (CA); Christine E. Bedford, Burlington (CA); Jennifer L. Belelie, Oakville (CA); Jeffrey H. Banning, Hillsboro, OR (US)

(73) Assignee: Xerox Corporation, Norwalk, CT (US)

( * ) Notice: Subject to any disclaimer, the term of this patent is extended or adjusted under 35 U.S.C. 154(b) by 822 days.

(21) Appl. No.: 11/034,866

(22) Filed: Jan. 14, 2005

(65) Prior Publication Data
US 2006/0159850 A1 Jul. 20, 2006

(51) Int. Cl.
*C09D 11/00* (2006.01)
*C09D 11/10* (2006.01)
*C08F 2/46* (2006.01)
*C08F 2/50* (2006.01)
*C08J 3/28* (2006.01)

(52) U.S. Cl. .............. 106/31.29; 106/31.13; 106/31.47; 106/31.58; 106/31.6; 106/31.61; 106/31.77; 106/31.8; 106/31.86; 522/113; 522/114; 522/116; 522/134; 522/135; 522/136; 522/150; 522/173; 522/174; 522/178; 522/182

(58) Field of Classification Search .............. 106/31.29, 106/31.61, 31.6, 31.47, 31.77, 31.58, 31.86, 106/31.8, 31.13; 522/113, 114, 116, 134, 522/135, 150, 173, 174, 178, 182
See application file for complete search history.

(56) References Cited

U.S. PATENT DOCUMENTS

| | | | |
|---|---|---|---|
| 4,559,371 A | 12/1985 | Hüsler et al. | |
| 4,582,862 A | 4/1986 | Berner et al. | |
| 6,547,380 B2 | 4/2003 | Smith et al. | |
| 6,797,739 B1 | 9/2004 | Kim et al. | |
| 6,872,243 B2 * | 3/2005 | Breton et al. | 106/31.29 |
| 7,153,349 B2 * | 12/2006 | Carlini et al. | 106/31.29 |
| 7,317,122 B2 * | 1/2008 | Carlini et al. | 560/115 |
| 2004/0065227 A1 | 4/2004 | Breton et al. | |
| 2006/0117993 A1 * | 6/2006 | Carlini et al. | 106/31.43 |
| 2006/0122354 A1 * | 6/2006 | Carlini et al. | 528/44 |

FOREIGN PATENT DOCUMENTS

WO WO 97/24364 7/1997
WO WO 2004/037799 A1 5/2004

OTHER PUBLICATIONS

Esch et al. New Functional Materials Based on Sefl-Assembling Organogels: From Serendipity towards Design. Angew. Chem. Int. Ed. 2000, 39, No. 13. pp. 2664-2266.*
Abdallah et al. Organogel and Low Molecular Mass Organic Additives. Advanced Materials. 2000, 12, No. 17. pp. 1237-1247.*
Mieden-Gundert et al.; Angew. Chem. Int. Ed., 40, No. 17, pp. 3164-3165 (2001).
De Loos et al.; "Remarkable Stabilization of Self-Assembled Organogels by Polymerization"; J. Am. Chem. Soc., 119, pp. 12675-12676 (1997).

* cited by examiner

*Primary Examiner*—Sanza L McClendon
(74) *Attorney, Agent, or Firm*—Oliff & Berridge, PLC

(57) ABSTRACT

An ink preferably used in piezoelectric ink jet devices includes an ink vehicle that includes at least one curable monomer, at least one polymerizable organic gelator, at least one initiator, at least one colorant and optionally at least one low molecular mass non-reactive organic gelator and/or at least one thermal solvent. The use of the curable gelator enables the ink to form a gel state having a viscosity of at least $10^{2.5}$ cps at very low temperatures of about 30° C. to about 50° C. The ink may thus be jetted at low temperatures of about 50° C. to about 90° C. The ink is heated to a first temperature above the gel point of the ink, jetted onto a surface maintained at a second temperature at which the ink forms a gel state, and when on the image receiving substrate, is exposed to radiation energy to polymerize the polymerizable components of the ink.

26 Claims, No Drawings

RADIATION CURABLE INKS CONTAINING CURABLE GELATOR ADDITIVES

BACKGROUND

Described herein are ink compositions ideally suited for use in ink jet ink printing devices. In embodiments, the ink includes a radiation curable gelator additive along with a colorant. The ink vehicle may also contain additional radiation curable components, along with an initiator for curing.

The volume of digital color printing is expected to experience significant growth in the coming years. The color images provided by ink jet printing inks are overwhelmingly preferred in panel studies over other digital imaging systems. There is also a strong case to be made that the total cost of ownership of an ink jet printer will ultimately be cheaper than similar volume electrophotography units.

Ink jetting devices are known in the art, and thus extensive description of such devices is not required herein. As described in U.S. Pat. No. 6,547,380, incorporated herein by reference, ink jet printing systems are generally are of two types: continuous stream and drop-on-demand. In continuous stream ink jet systems, ink is emitted in a continuous stream under pressure through at least one orifice or nozzle. The stream is perturbed, causing it to break up in to droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Piezoelectric ink jet devices utilizing wax-like solid inks typically suffer from two shortcomings. First, the images formed are presently not very robust, i.e., the formed images are easily damaged, for example easily scratched. Second, the printers consume large amounts of energy due to the higher jetting temperatures required for the melting and jetting of conventional solid hot melt inks.

Conventional phase change hot melt inks typically used with ink jet printers of the aforementioned type frequently utilize a wax based ink vehicle, e.g., a crystalline wax. Use of such crystalline waxes requires that the printhead be kept at least at 135° C. throughout printing with the device. The wax based inks are heated to such high temperatures to decrease their viscosity for proper jetting. Moreover, if the printhead is cooled and re-warmed, a lengthy purge cycle that consumes significant amounts of ink must be carried out. The brittle crystalline waxes also do not provide robust images and are easily scratched. This is because wax based inks generally crystallize at temperatures greater than room temperature and therefore, the wax based ink that has been transferred to the recording medium is essentially as hard as it will get. The high energy consumption, waste of expensive ink during purging, and fragile images all cause customer dissatisfaction, and in some markets prevent any sales penetration at all.

Recently, Xerox has discovered several radiation curable inks that may be jetted at much lower temperatures and that achieve robust images following curing. Reference is made to the following patent properties, each of which is incorporated herein by reference in its entirety. (1) application Ser. No. 11/034,850 entitled "Low Level Cure Transfuse Assist for Printing with Radiation Curable Ink"; (2) application Ser. No. 11/034,856 entitled "Ink Jet Ink Curable Via Different Polymerization Routes"; and (3) application Ser. No. 11/034,714 entitled "Ink Jet Ink of Functionalized Waxes" U.S. Pat. Nos. 6,561,640 and 6,536,889, each incorporated herein by reference in its entirety, describe processes of forming ink jetted images using UV curable inks.

U.S. Pat. No. 5,892,116 (Weiss et al.) and PCT Patent Publication WO 97/24364 (Weiss et al.), the disclosures of each of which are totally incorporated herein by reference, disclose gelators that gel a variety of nonpolar and polar liquids. Moreover, gelation of various monomers with subsequent polymerization of the gelled monomers forms organic zeolites and membrane materials.

While known compositions and processes are suitable for their intended purposes, a need remains for improvements in radiation curable inks, for example with respect to jetting temperatures, fusing latitude and image quality.

SUMMARY

These and other improvements are accomplished by the inks described herein, and processes of forming images with such inks.

In embodiments, the ink is comprised of a radiation curable gelator material, a colorant and an initiator. The ink may also include additional radiation curable monomers or oligomers.

That is, in embodiments, the ink, preferably used in piezo-electric ink jet devices, includes an ink vehicle that includes at least one polymerizable organic gelator, at least one photo-initiator, and at least one colorant. The use of the gelator enables the ink to form a gel state having a viscosity of at least $10^3$ cps at very low temperatures of about 30° C. to about 50° C. The ink may thus be jetted, for example onto an intermediate transfer member surface, at very low jetting temperatures of, for example, about 50° C. to about 90° C.

In embodiments of forming an image with the ink, the ink is heated to a first temperature above the gel point of the ink, jetted onto an intermediate transfer member surface maintained at a second temperature at which the ink forms a gel state, subsequently transferred from the intermediate transfer member surface to an image receiving substrate, and exposed to radiation energy to initiate polymerization of the polymerizable components of the ink. The inks preferably form a gel state upon the intermediate transfer member surface, the ink viscosity in the gel state increasing at least about $10^3$ times the viscosity of the ink at the jetting temperature.

In another embodiment of forming an image with the ink, the ink is heated to a first temperature above the gel point of the ink and printed directly onto an image receiving substrate maintained at a second temperature, typically at or slightly above room temperature, at which the ink forms a gel state, and exposed to radiation energy to initiate polymerization of the polymerizable components of the ink.

DETAILED DESCRIPTION OF EMBODIMENTS

By curable herein is meant polymerizable, i.e., a material that may be cured via polymerization routes, including for example cationic routes and free radical routes.

In a first embodiment, the ink is comprised of at least one radiation curable organic gelator and at least one colorant.

The gelator is preferably nonpolymeric, i.e., monomeric or oligomeric. The organic gelator functions to dramatically increase the viscosity of the ink within a desired temperature range. In particular, the gelator forms a solid-like gel in the ink vehicle at temperatures below the temperature at which the ink is jetted. The gel phase typically comprises a solid-like phase and a liquid phase in coexistence, wherein the solid-like phase forms a three-dimensional network structure throughout the liquid phase and prevents the liquid phase from flowing at a macroscopic level. The inks exhibit a thermally reversible transition between the gel state and the liquid state when the temperature is varied above or below the gel point of the ink. This cycle of gel reformation can be repeated a number of times, since the gel is formed by physical, non-covalent interactions between the gelator molecules, such as hydrogen bonding, aromatic interactions, ionic bonding, coordination bonding, London dispersion interactions, or the like.

Inks in embodiments may be liquid or solid at room temperature. It is desired for the radiation curable inks to have a viscosity of about 5 to about 20 centipoise (cps), preferably about 8 to about 16 cps, at the temperature of jetting. In preferred embodiments, the inks are jetted at low temperatures, in particular at temperatures of about 50° C. to about 90° C., preferably about 60° C. to about 85° C.

At such low jetting temperatures, the conventional use of temperature differential between the jetted ink and the substrate upon which the ink is jetted in order to effect a rapid phase change in the ink (i.e., from liquid to solid or semisolid) may not be as effective. The gelator can thus be used to affect a rapid viscosity increase in the jetted ink upon the substrate.

In particular, jetted ink droplets would be pinned into position on a receiving substrate such as an image receiving medium (e.g., paper) or an intermediate transfer member (e.g., a trans-fuse drum or belt) that is at a temperature cooler than the ink jetting temperature of the ink through the action of a phase change transition in which the ink undergoes a significant viscosity change from a liquid state to a gel state (or semi-solid state). The gelled ink is effectively a physical gel, and also a thermally reversible and elastic aggregate or networked assembly of chemical components, held together by non-covalent bonds such as hydrogen bonding and Van der Waals hydrophobic forces.

In embodiments, the temperature at which the ink forms the gel state is, for example, from about 30° C. to about 50° C., preferably from about 30° C. to about 40° C. In cooling from the jetting temperature liquid state to the gel state, the ink undergoes a significant viscosity change. The viscosity increase is preferably at least a $10^{2.5}$-fold increase in viscosity.

In indirect printing techniques, i.e., techniques in which the image is first jetted onto an intermediate transfer member, it has been found that optimum transfer efficiency from the intermediate transfer surface and optimum print quality may be achieved if the viscosity of the ink image deposited on the drum is greatly increased after jetting the ink, so as to obtain a stable and transfusable image that will not smear. A suitable gelling agent for the ink would gel the monomers/oligomers in the ink vehicle quickly and thermally reversibly, and demonstrate a narrow phase-change transition over the temperature range of 30-60° C. The gel state of the ink should also preferably exhibit a minimum of $10^{2.5}$ cps increase in viscosity at the transfusing temperature, e.g., about 30 to about 40° C., compared to the viscosity at the jetting temperature, e.g., about 12 to about 8 cps at about 65 to about 80° C. Further, the gel ink preferably also has good elastic properties to enable complete transfer from the drum, a property which can be inferred from the value of the elastic modulus (G' max) at the transfuse temperature.

When the inks are in the gel state, the viscosity of the ink is at least about 1,000 cps, preferably at least about 10,000 cps, more preferably at least about 100,000 cps. Preferred viscosity values in the gel state are in the range of from about $10^{2.5}$ to about $10^9$ cps, and more preferably from about $10^{5.5}$ to about $10^{8.5}$ cps, although the viscosity can be outside of these ranges.

In preferred embodiments, the curable organic gelators are designed with amphiphilic properties. The curable organic gelators are preferably selected from among one-dimensional self-aggregating molecules such as functional N-acyl-1,ω-amino acid derivatives, di-functional (1R,2R)-trans-1,2-bis(ureido)cyclohexane derivatives, and/or difunctional ortho bis(ureido)benzene derivatives. These gelators may be used in inks that are liquid or solid, as well as those that contain a high level of liquid/solid plasticizers, e.g., plastisol inks. The gelators offer increased resilience through hydrogen and optionally through covalent bonding.

The functional N-acyl-1,ω-amino acid derivatives may be any of those described by Mieden-Gundert in Angew. Chem. Int. Ed. 2001, 40, No. 17, p. 3164-3165. The di-functional (1R,2R)-trans-1,2-bis(ureido)cyclohexane derivatives may be any of those described by De Loos et al. in a paper entitled "Remarkable Stabilization of Self-Assembled Organogels by Polymerization" in J. Am. Chem. Soc. 1997, 119, 12675-12676.

The following curable gelators or mixtures of gelators are preferred for the design of low energy ink compositions. These gelators can be used as gelators in the concentration range of $10^{-4}$ to $10^{-1}$ moles/liter and preferably from $5\times10^{-4}$ to $10^{-2}$ moles/liter in low melting curable compositions. The gelators thus preferably comprise from about 1 to about 20% by weight of the ink, more preferably from about 2 to about 10% by weight of the ink. Increasing the amount of organic gelator in the ink typically increases the temperature at which the transition from gel state to liquid state occurs; accordingly, it is possible to adjust physical characteristics of the ink such as the gel-liquid transition temperature by adjusting the amount of gelator. It is also possible to adjust the transition from gel to liquid by selecting different conditions for the imaging process, such as shear, stress, and rate of heating or cooling.

As specific preferred curable organic gelators in this embodiment, mention may be made of the following examples:

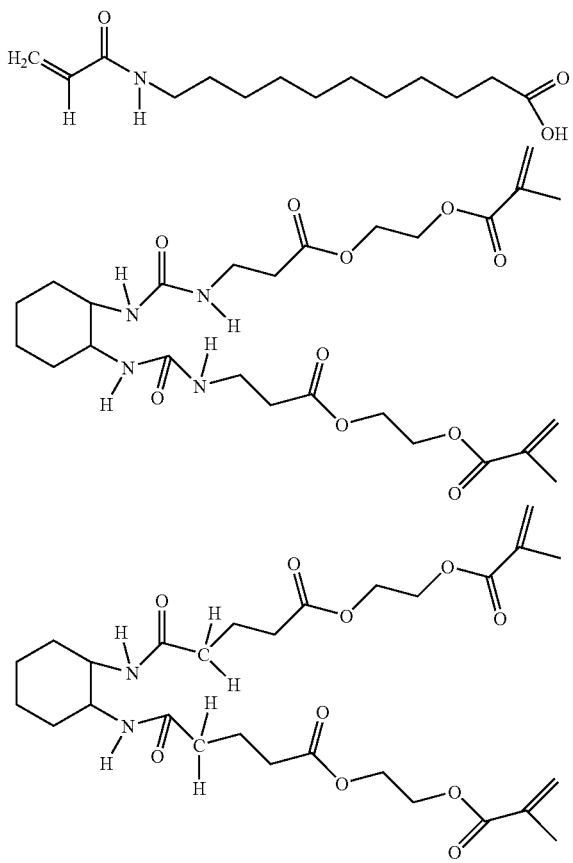

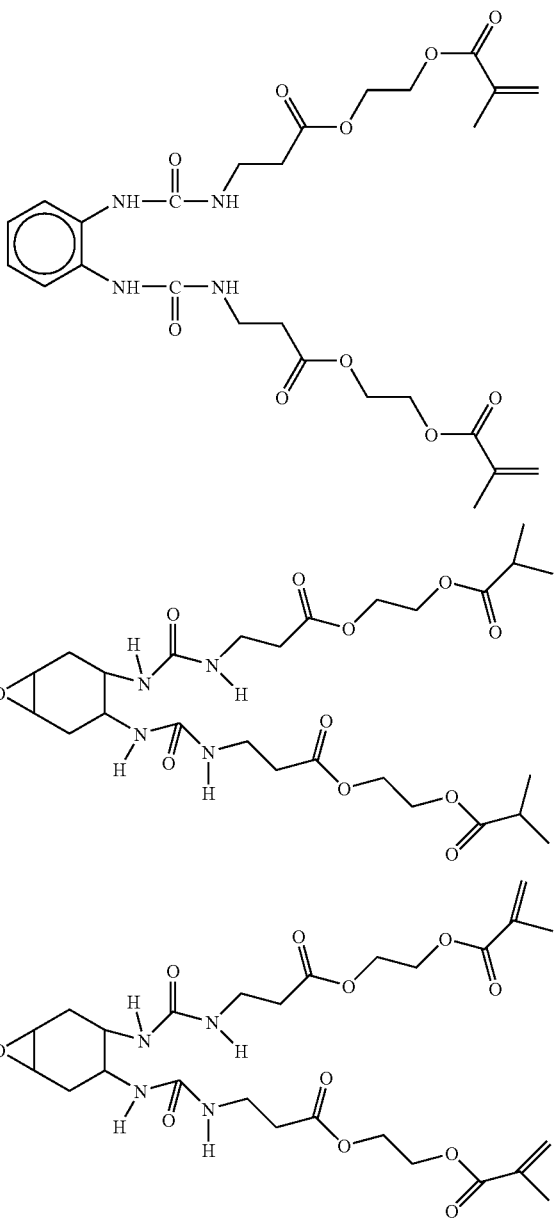

Other preferred polymerizable gelators also include those disclosed at SAFIN 2001, Euroconference on Self-Assembled Fibrillar Networks held in Autrans, France on Nov. 24-28, 2001. These are (from U. Beginn et al.):

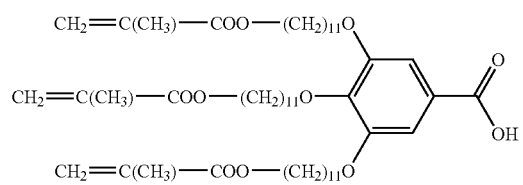

-continued

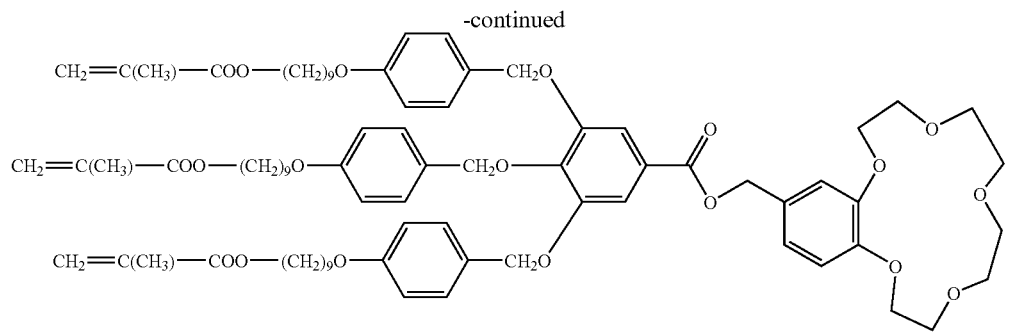

and (from Berthier D. et al.):

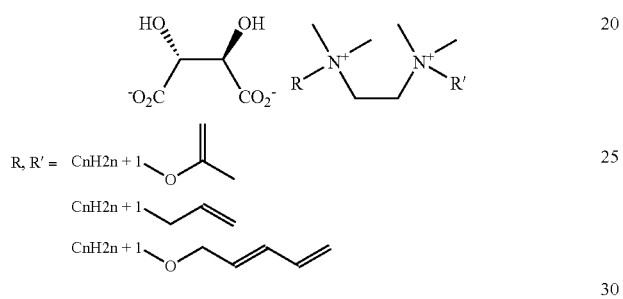

Still further, a very large list of organic gelators is set forth in U.S. Patent Publication 2004-0065227 A1, incorporated herein by reference in its entirety. Any of the organic gelators described therein may be used in the inks herein, so long as the organic gelators are modified to include a curable or polymerizable group, i.e., a group that allows the gelator to become curable and participate in the network formed upon radiation curing of the ink. In this regard, if the organic gelator is to be cationically curable, the organic gelator may be modified to include cationically curable groups such as epoxy, vinyl ether, or styrene groups and the like. If the organic gelator is to be radically curable, the gelator may be modified to include an acrylate group, meth(acrylate) group, or allyl ether group and the like. The modification of the gelators described in U.S. Patent Publication 2004-0065227 A1 to include such reactive groups may be done by any suitable technique, example techniques of which are well understood by practitioners in the art and thus need not be detailed herein. Suitable gelators set forth in U.S. Patent Publication 2004-0065227 A1 that may be modified as discussed above include, for example, ureidopyrimidone, and the following

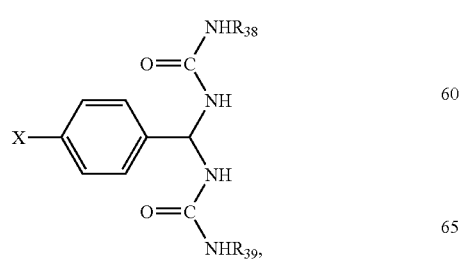

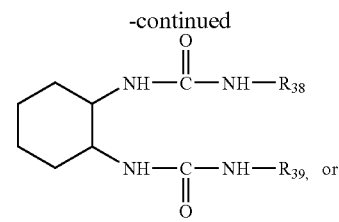

wherein X is a hydrogen atom, a halogen atom, a nitro group, an alkoxy group of the formula —$OR_{50}$, or an amino group of the formula —$NR_{91}R_{92}$, and wherein $R_{38}$, $R_{39}$, $R_{50}$, $R_{91}$, and $R_{92}$ each, independently of the other, is hydrogen atom, an alkyl group, an aryl group, an arylalkyl group, or an alkylaryl group;

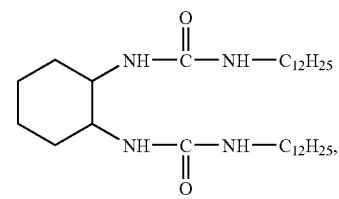

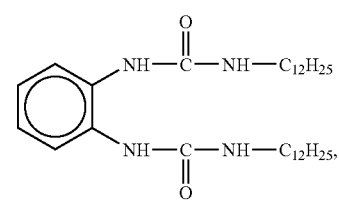

9
-continued
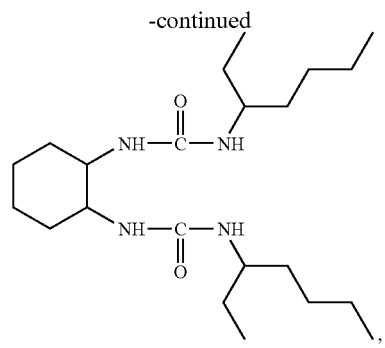
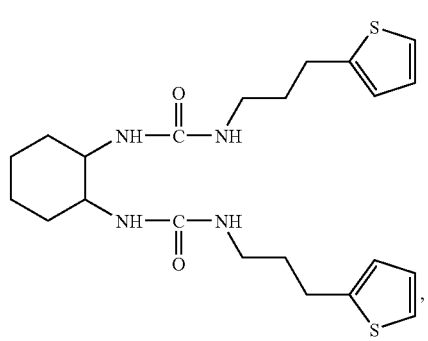
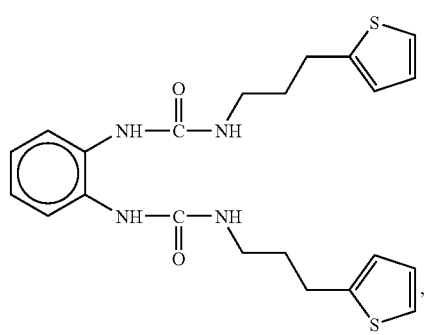
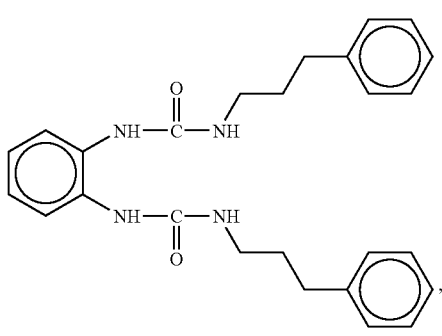
10
-continued
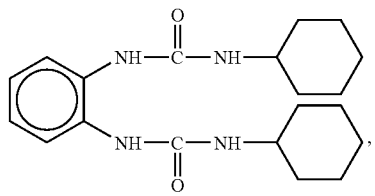
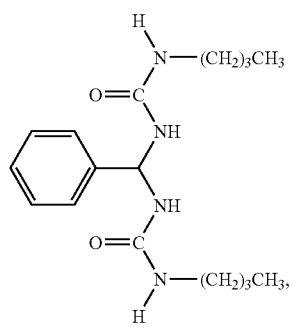
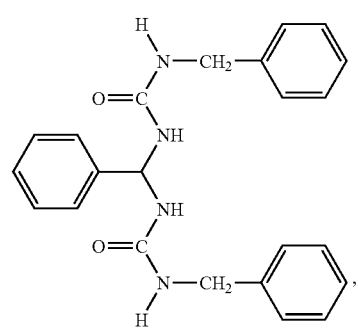
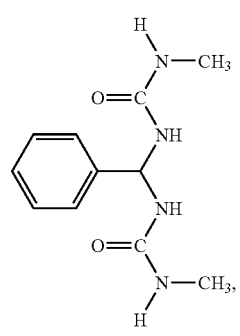

US 7,459,014 B2
11
-continued
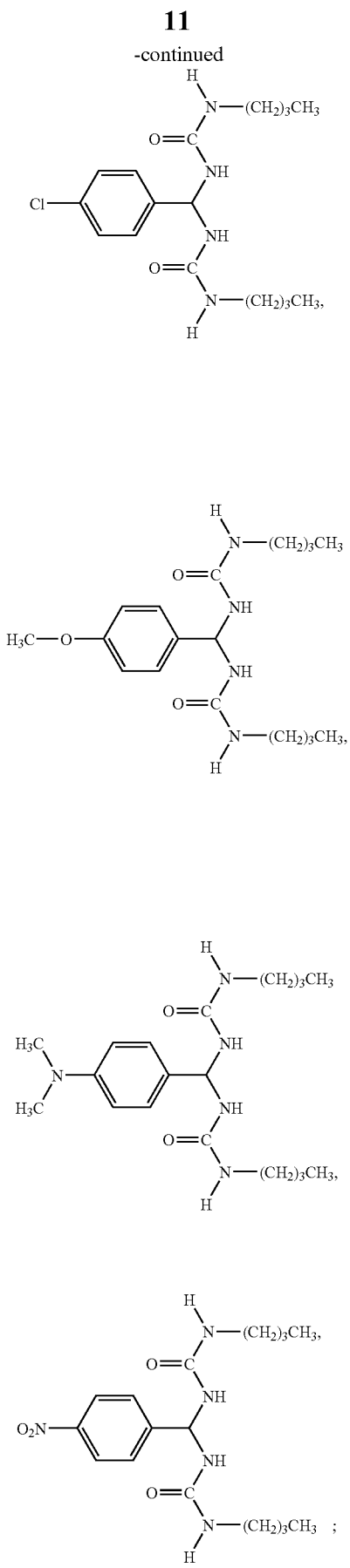
12
-continued
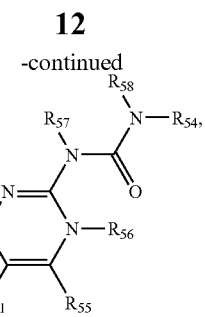
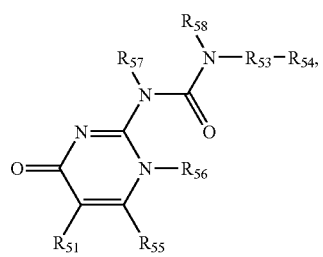
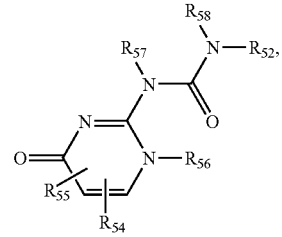
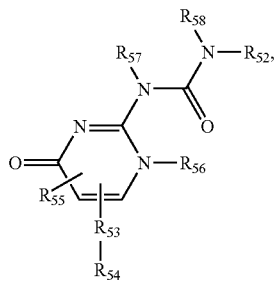
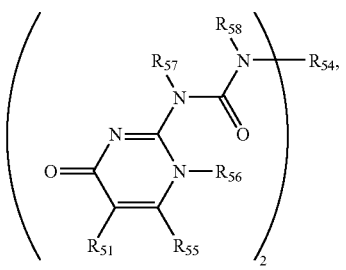
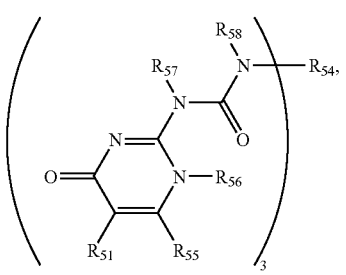

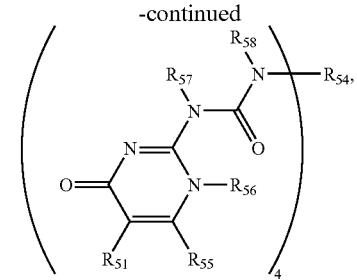
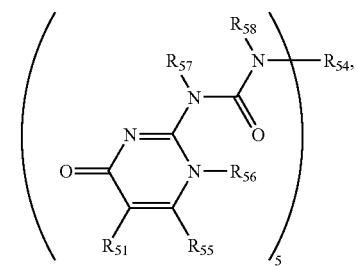
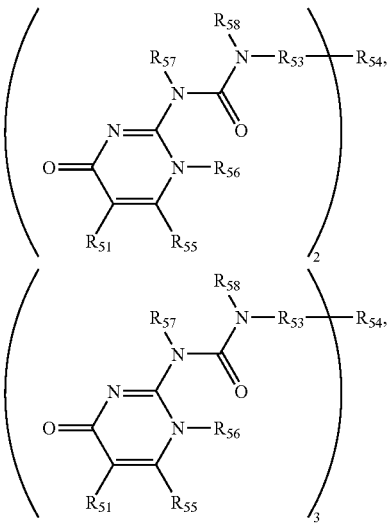
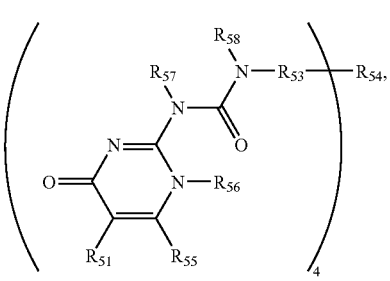
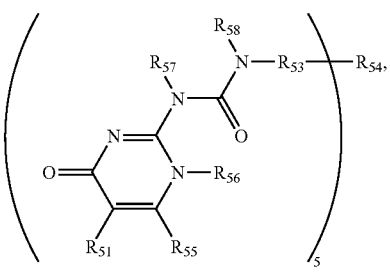
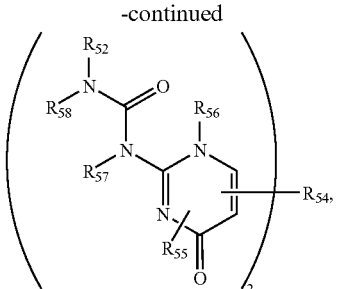
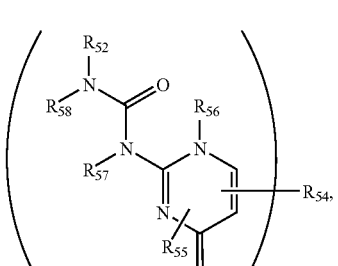
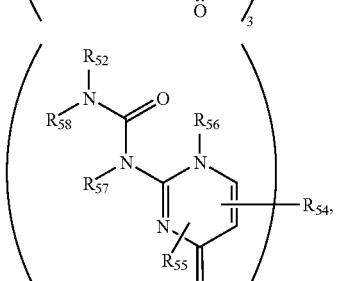
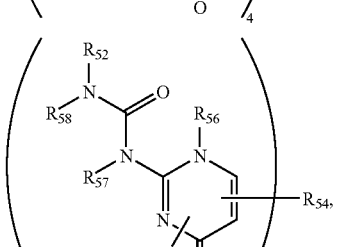
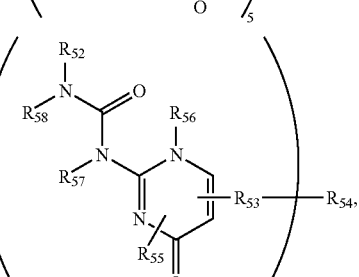
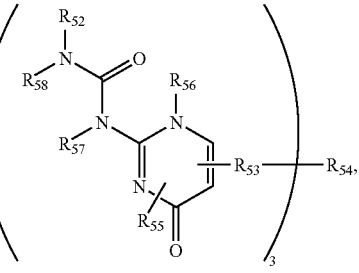

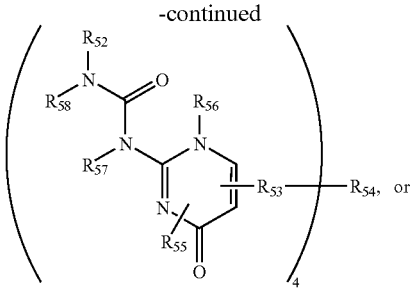

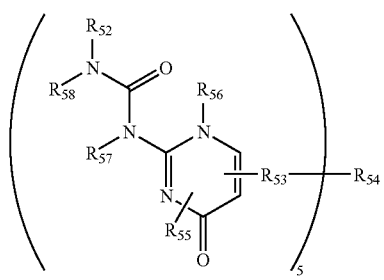

wherein, provided that at least one of $R_{52}$, $R_{56}$, $R_{57}$, and $R_{58}$ is a hydrogen atom, $R_{51}$, $R_{52}$, $R_{55}$, $R_{56}$, $R_{57}$, and $R_{58}$ each, independently of the other, is a hydrogen atom, an alkyl group, an aryl group, an arylalkyl group, or an alkylaryl group, $R_{53}$ is an alkylene group, an arylene group, an arylalkylene group, an alkylarylene group, an alkyleneoxy group, an aryleneoxy group, an arylalkyleneoxy group, an alkylaryleneoxy group, a polyalkyleneoxy group, a polyaryleneoxy group, a polyarylalkyleneoxy group, or a polyalkylaryleneoxy group, and $R_{54}$ is an alkyl or alkylene group, an aryl or arylene group, an arylalkyl or arylalkylene group, an alkylaryl or alkylarylene group, an alkoxy or alkyleneoxy group, an aryloxy or aryleneoxy group, an arylalkyloxy or arylalkyleneoxy group, an alkylaryloxy or alkylaryleneoxy group, a polyalkyleneoxy group, a polyaryleneoxy group, a polyarylalkyleneoxy group, a polyalkylaryleneoxy group, a silyl or silylene group, a siloxane group, a polysilylene group, or a polysiloxane group;

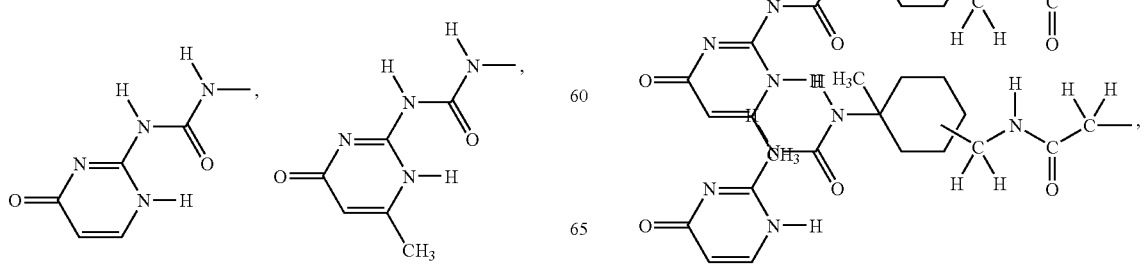

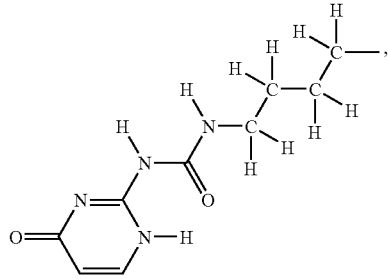

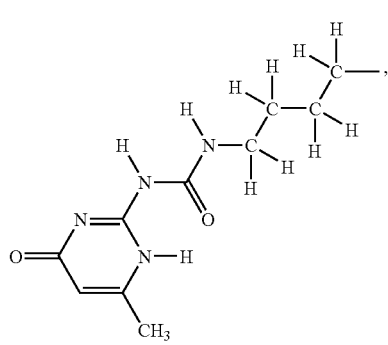

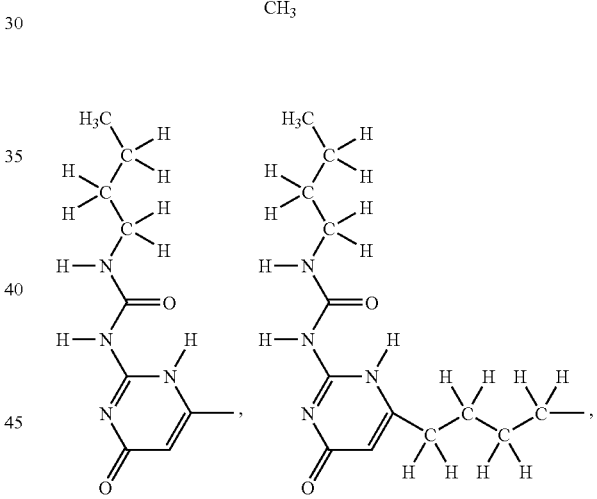

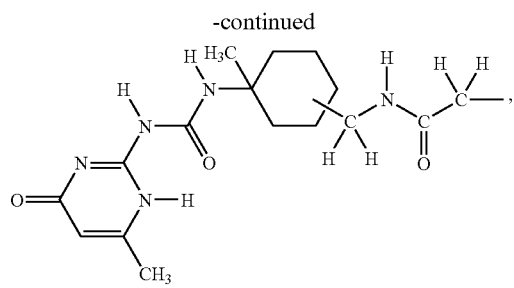

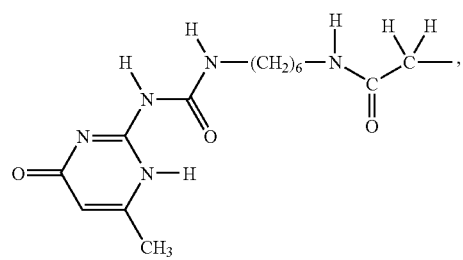

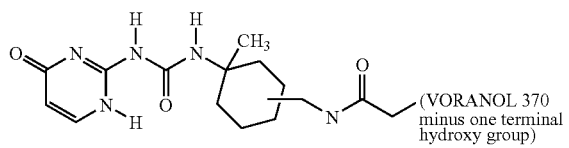
(VORANOL 370 minus one terminal hydroxy group)

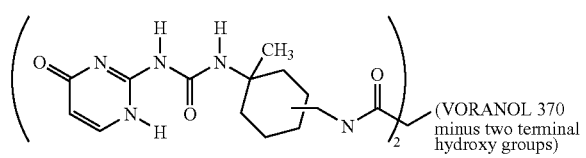
(VORANOL 370 minus two terminal hydroxy groups)

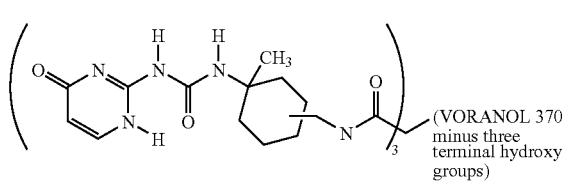
(VORANOL 370 minus three terminal hydroxy groups)

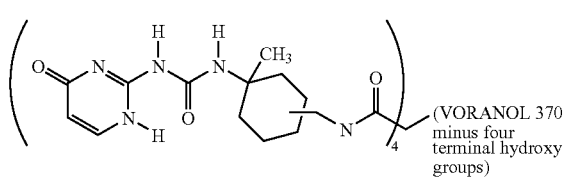
(VORANOL 370 minus four terminal hydroxy groups)

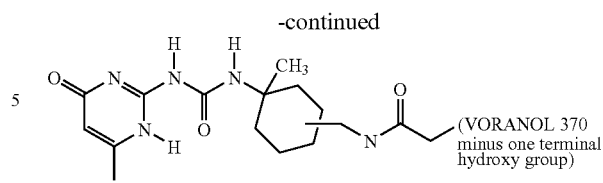
(VORANOL 370 minus one terminal hydroxy group)

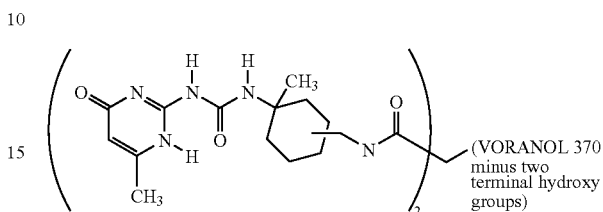
(VORANOL 370 minus two terminal hydroxy groups)

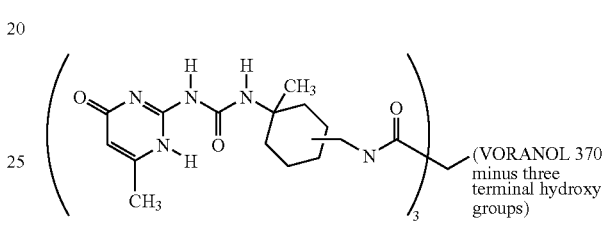
(VORANOL 370 minus three terminal hydroxy groups)

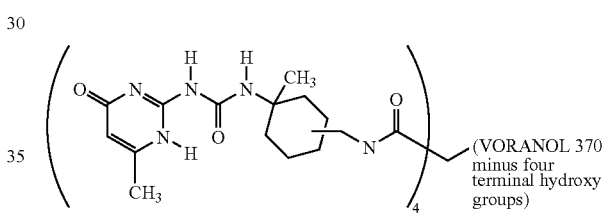
(VORANOL 370 minus four terminal hydroxy groups)

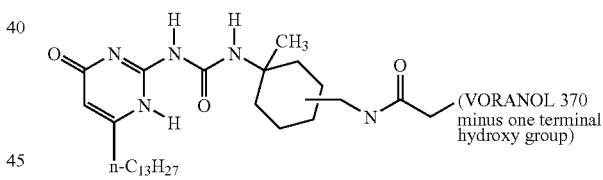
(VORANOL 370 minus one terminal hydroxy group)

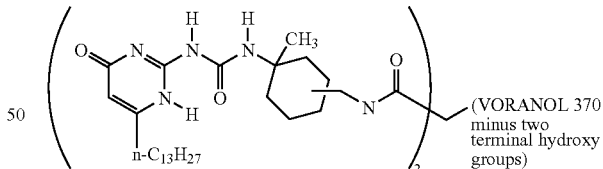
(VORANOL 370 minus two terminal hydroxy groups)

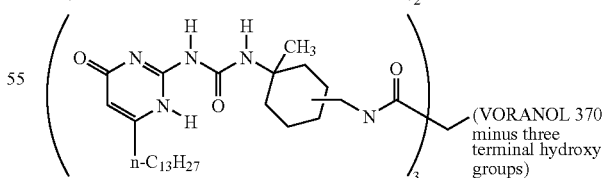
(VORANOL 370 minus three terminal hydroxy groups)

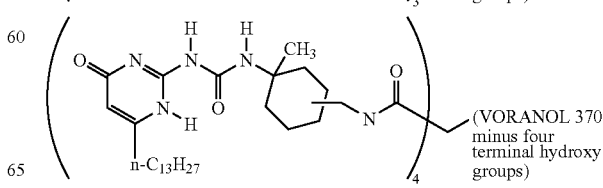
(VORANOL 370 minus four terminal hydroxy groups)

wherein VORANOL™ 370
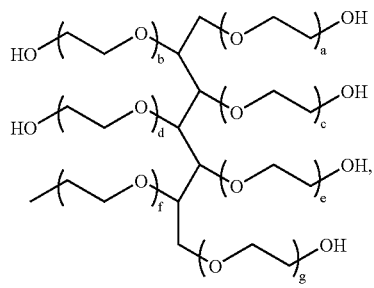
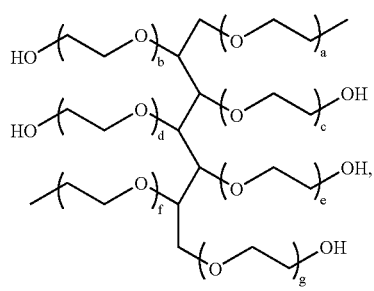
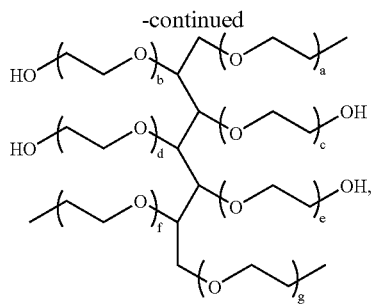
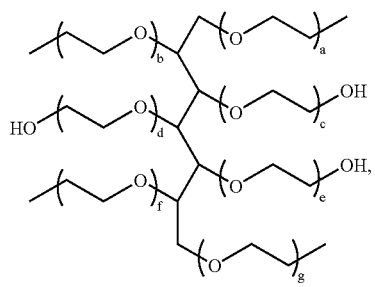
wherein a, b c, d, e, f, and g are each integers representing the number of ethylene oxide repeat units and the molecular weight of the starting material (wherein all end groups are terminated by hydroxy groups) is about 1,040;
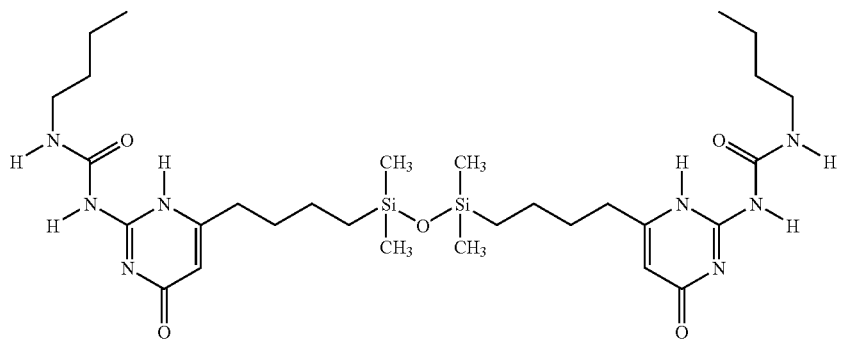
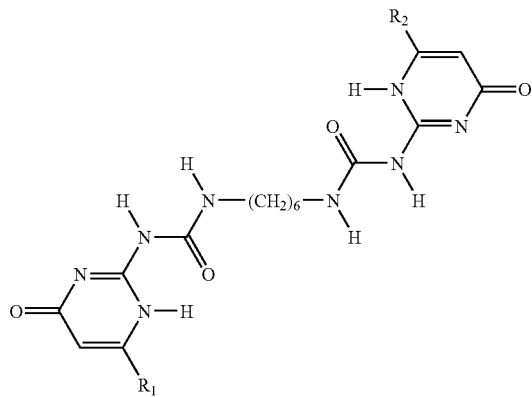

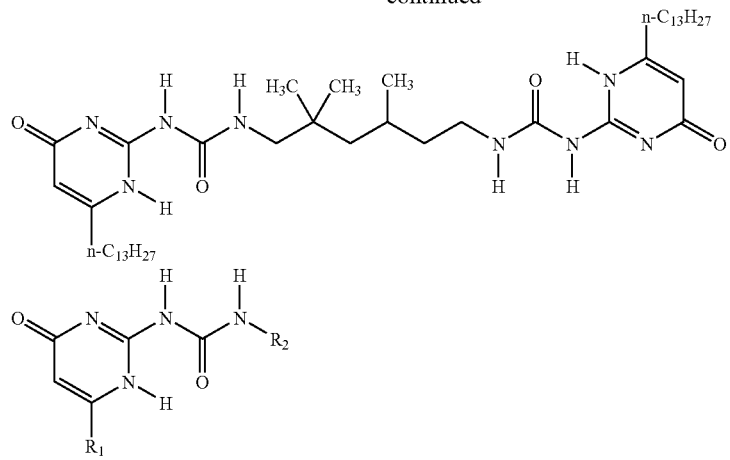

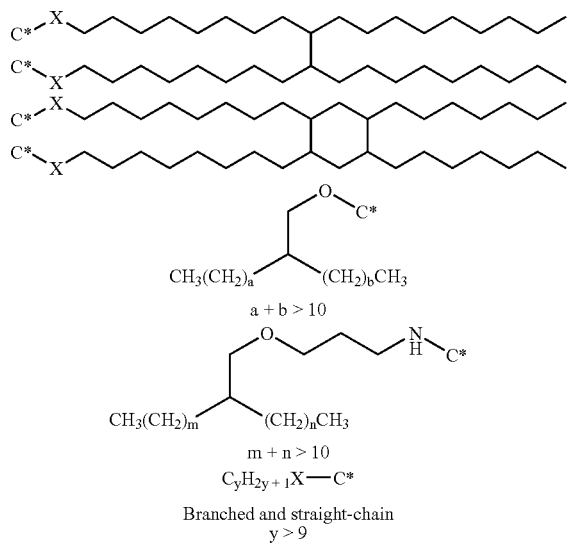

wherein $R_1$, and $R_2$ each, independently of the other, is an alkyl group with from 1 to about 18 carbon atoms.

It is preferred in embodiments for the inks to also include one or more reactive diluents, i.e., curable monomers or oligomers that may be included in the ink vehicle to appropriately adjust the viscosity/rheology of the ink so as to achieve jetting and gelling of the ink within the desired temperature ranges. The radiation curable diluents preferably comprise a material including one or more unsaturated functional groups therein.

For example, where the organic gelator is cationically curable (e.g., includes epoxy, vinyl ether or styrene groups), additional cationically curable monomers or oligomers may be included in the ink vehicle.

Such cationically radiation-curable monomers may include, for example, cycloaliphatic epoxide, and preferably one or more polyfunctional cycloaliphatic epoxides. The epoxy groups may be internal or terminal epoxy groups such as those described in WO 02/06371, incorporated herein by reference. Multifunctional vinyl ethers can also be used. Additional example curable monomers/oligomers include the following:

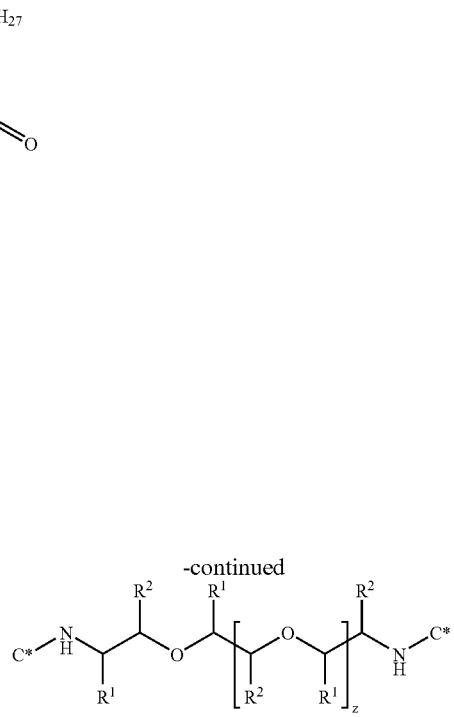

When $R^1 = CH_3$, $R^2 = H$; when $R^1 = H$, $R^2 = CH_3$
isomeric mixture of propyloxy (PO) units In the foregoing, X may be O or NH, and C* may be

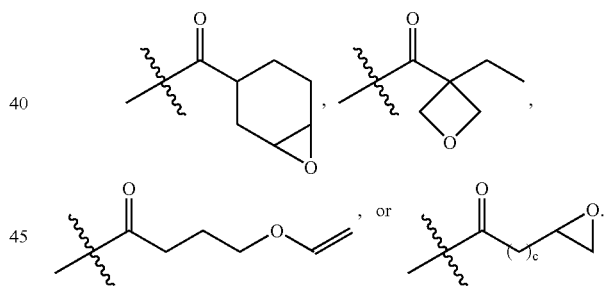

Such radically radiation-curable monomers may include, for example, acrylate and methacrylate monomers. As relatively non polar monomers, mention may be made of isobornyl(meth)acrylate, lauryl(meth)acrylate, isodecyl (meth)acrylate, isooctyl(meth)acrylate, and butyl acrylate. In addition, multifunctional acrylate monomers/oligomers may be used not only as reactive diluents, but also as materials that can increase the crosslink density of the cured image, thereby enhancing the images toughness. As multifunctional acrylates and methacrylates, mention may be made of pentaerytritol tetra(meth)acrylate, 1,2ethylene glycol di(meth)acrylate, 1,6 hexanediol di(meth)acrylate, 1,12-dodecanol di(meth)acrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR 494), and the like.

The reactive diluent material is preferably added to the ink in amounts of from, for example, 0 to about 70% by weight, preferably about 10 to about 60% by weight of the ink.

The ink compositions also contain a colorant. Any desired or effective colorant can be employed in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include, but are not limited to, Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are preferred.

Pigments are also suitable colorants for the inks. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™. (Cabot), Carbon Black 5250, Carbon Black 5750 (Columbia Chemical), mixtures thereof and the like.

The colorant is preferably included in the ink in an amount of from, for example, about 0.1 to about 15% by weight of the ink, preferably about 0.5 to about 6% by weight of the ink.

The ink also includes an initiator, e.g., a photoinitiator, that absorbs radiation, for example UV light radiation, to initiate curing of the curable components of the ink. As the initiator for radically curable inks, e.g., acrylate group-containing or polyamide containing inks, mention may be made of photoinitiators such as benzophenones, benzoin ethers, benzilketals, α-hydroxyalkylphenones, α-aminoalkylphenones and acylphosphine photoinitiators sold under the trade designations of kgacure and Darocur from Ciba. Specific examples include 2,4,6-trimethylbenzoyldiphenylphosphine oxide (available as BASF Lucirin TPO); 2,4,6-trimethylbenzoylethoxyphenylphosphine oxide (available as BASF Lucirin TPO-L); bis(2,4,6-trimethylbenzoyl)-phenyl-phosphine oxide (available as Ciba Irgacure 819) and other acyl phosphines; 2-methyl-1-(4-methylthio)phenyl-2-(4-morpholinyl)-1-propanone (available as Ciba Irgacure 907) and 1-(4-(2-hydroxyethoxy)phenyl)-2-hydroxy-2-methylpropan-1-one (available as Ciba Irgacure 2959); 2-benzyl 2-dimethylamino 1-(4-morpholinophenyl)butanone-1 (available as Ciba Irgacure 369); titanocenes; isopropylthioxanthone; 1-hydroxy-cyclohexylphenylketone; benzophenone; 2,4,6-trimethylbenzophenone; 4-methylbenzophenone; 2,4,6-trimethylbenzoylphenylphosphinic acid ethyl ester; oligo (2-hydroxy-2-methyl-1-(4-(1-methylvinyl)phenyl)pro-panone); 2-hydroxy-2-methyl-1-phenyl-1-propanone; benzyldimethylketal; and mixtures thereof. Mention may also be made of amine synergists, for example such as ethyl-4-dimethylaminobenzoate and 2-ethylhexyl-4-dimethylaminobenzoate. These photoinitiators typically absorb radiation at wavelengths ranging from about 200 to about 420 nm, although titanocenes may absorb at wavelengths of up to about 560 nm. The lower limit is typically determined by the transmittance of quartz, as most UV sources are quartz bulbs. This list is not exhaustive, and any known photoinitiator that initiates the free radical reaction upon exposure to a desired wavelength of radiation such as UV light can be used without limitation.

As the initiator for cationically curable inks, mention may be made of photoinitiators such as sulfonium, sulfoxonium, and iodonium salts (e.g., arylsulfonium hexafluorophosphate salt, commercially available as UVI-6992 from Dow), and sensitized acids such as 5,7-diiodo-3-butoxy-6-fluorene (commercially available as H-Nu 470, H-Nu 535 and H-Nu 635 from Spectra Group Ltd.) combined with diaryl iodonium hexafluoroantimonate (available as SR 1012 from Sartomer Company, Inc.) (Spectra Group, Ltd.). These photoinitiators typically absorb radiation at wavelengths ranging from about 200 to about 340 nm, although titanocenes may absorb at wavelengths of up to about 560 nm.

The total amount of initiator included in the ink may be from, for example, about 0.5 to about 15%, preferably from about 1 to about 10%, by weight of the ink.

The inks may also optionally include 0 to about 50% by weight, preferably about 10 to about 35% by weight, of the ink of a low molecular weight wax or thermal solvent. These materials may be included to increase the viscosity of the ink at room temperature, often rendering the ink solid or semi-solid. Upon heating to the jetting temperature, these solid materials at room temperature can function as compatibilizer solvents for the ink components, hence the name thermal solvents. Example waxes to include in the ink may be, for example, paraffins, microcrystalline waxes, polyethylene waxes, ester waxes, amide waxes, fatty acids, fatty alcohols, fatty amides and other waxy materials. Example thermal solvents to include in the ink may be, for example, low molecular weight polyols, sulfonamide materials (e.g., methyl sulfonamide), urea, ethyl urea, ethylene carbonate, tetrahydrothiophene-1,1-dioxide, methyl anisate, bifunctional fatty alcohols such 1,10 decanediol or 1,12 dodecanediol, pyridine N-oxide (mp 61-65° C.), acetamide (mp 79-81° C.), acrylamide (mp 84-86° C.), sulfamide (mp 91-92° C.), maleimide (mp 92-94° C.), pyrazole (mp 67-70° C.), and imidazole (mp 90-91° C.).

In embodiments, it is preferred to include a bifunctional fatty alcohol as a thermal solvent in an amount of from about 25 to about 35% by weight of the ink. In such embodiments, the use of cationic curing over free radical curing may be advantageous since the fatty alcohols can react during the cationic cure so as to become part of the cured network.

The inks can also optionally contain an antioxidant. The optional antioxidants of the ink compositions protect the images from oxidation and also protect the ink components from oxidation during the heating portion of the ink preparation process. Specific examples of suitable antioxidants in can stabilizers include NAUGARD™ 524, NAUGARD™ 635, NAUGARD™ A, NAUGARD™ I-403, and NAUGARD™ 959, commercially available from Crompton Corporation, Middlebury, Conn., IRGANOX™ 1010, Irgastab UV 10 commercially available from Ciba Specialty Chemicals, and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

The inks may also optionally contain non-reactive agents that help control the extent of reactivity of the network formed from the curable gelators. The non-reactive reactivity control agent may comprise a non-reactive model of the reactive gelator compound. The non-reactive organogelator preferably has a low molecular mass, and is most preferably a N-acyl-1,ω-amino acid derivative. An example of such reactivity-control agent is

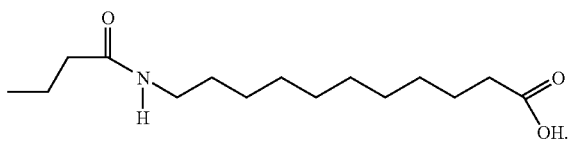

Other optional additives to the inks include plasticizers, such as UNIPLEX™ 250 (commercially available from Uniplex), the phthalate ester plasticizers commercially available from Monsanto under the trade name SANTICIZER™, such as dioctyl phthalate, diundecyl phthalate, alkylbenzyl phthalate (SANTICIZER™ 278), triphenyl phosphate (commercially available from Monsanto), KP-140™, a tributoxyethyl phosphate (commercially available from FMC Corporation), MORFLEX™ 150, a dicyclohexyl phthalate (commercially available from Morflex Chemical Company Inc.), trioctyl trimellitate (commercially available from Eastman Kodak Co.), and the like, may be added in an amount of about 0.1 to about 25% by weight of the ink, preferably about 1 to about 20% by weight of the ink.

The inks of embodiments of the invention may further include conventional type additives to take advantage of the known functionality associated with such conventional additives. Such additives may include, for example, defoamers, slip and leveling agents, pigment dispersants, etc.

The inks may be prepared by any suitable technique. As an example, the inks may be prepared by first dissolving any non-reactive components of the ink into a selected molten vehicle, e.g., composed of compatible low molecular waxes and/or thermal solvents, then while heating at appropriate temperature, adding the specified amount of curable gelator, preferably less than 50% and more preferably less than 10% by weight of the ink, and thereafter adding the dye or pigment dispersion (preferably as a concentrate in thermal solvent) while agitating the mixture. Finally, the required amount of initiator(s) should be added. The ink may then be filtered, preferably at an elevated temperature, through a filter or series of filters, the final filtration being done through a 1.0 micron filter to remove larger particulates. The method of preparation for the inks may be modified so as to accommodate the type of reactive gelling agents used for the preparation of the inks. For example, a concentrate of the gelling agent may be prepared in one of the components of the ink prior to the addition of the other components. Further examples of ink preparation methods are set forth in the Examples below.

The inks described herein are preferably jetted at temperatures of about 50° C. to about 90° C., preferably about 60° C. to about 85° C. At jetting, the inks preferably have a viscosity of from about 8 to about 16 cps, most preferably about 10 to 13 cps. The inks are thus ideally suited for use in piezoelectric ink jet devices.

The inks can be employed in apparatus for direct printing ink jet processes, wherein when droplets of the melted ink are ejected in an imagewise pattern onto a recording substrate, the recording substrate is a final recording substrate. In this embodiment, the ink is heated to a first temperature above the gel point of the ink and printed directly onto an image receiving substrate. The image receiving substrate is preferably kept at a second temperature at which the ink forms a gel state, which is preferably at or slightly above room temperature as discussed above. For example, the substrate may be maintained at a temperature of about 30° C. to about 50° C., preferably from about 30° C. to about 40° C. In this way, the jetted ink may be made to rapidly form a gel, which gel may be maintained on the surface of the substrate until curing. The ink on the substrate is exposed to radiation energy to initiate polymerization of the polymerizable components of the ink.

The inks can also be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

The inks are ideally suited for jetting onto an intermediate transfer substrate, e.g., an intermediate transfuse drum or belt.

In a suitable design, the image may be applied by jetting appropriately colored inks during four to six rotations (incremental movements) of the intermediate transfuse member with respect to the ink jetting head, i.e., there is a small translation of the printhead with respect to the substrate in between each rotation. This approach simplifies the printhead design, and the small movements ensure good droplet registration. Transfuse, i.e., a transfer and fusing step, is desirable in forming the image as transfuse enables a high quality image to be built up on a rapidly rotating transfer member. This approach simplifies the printhead design, while the small movements of the head ensure good droplet registration. Transfuse typically involves jetting the ink from the ink jet head onto an intermediate member such as a belt or drum, i.e., the transfuse member. This allows the image to be rapidly built onto the transfuse member for subsequent transfer and fusing to an image receiving substrate.

The intermediate transfer member may take any suitable form, although it is preferably a drum or belt. The member surface may be at room temperature, although in embodiments it is preferable to heat the member such that a surface temperature thereof is maintained within a narrow temperature range so as to control the gelling characteristics of the inks over a wide range of environmental conditions. This temperature range is preferably, for example, within the gel state temperature range for the ink. For example, the surface may be maintained at a temperature of about 30° C. to about 50° C., preferably from about 30° C. to about 40° C. In this way, the jetted ink may be made to rapidly form a gel, which gel is maintained on the surface of the transfer member until transfer to the image receiving substrate.

Once upon the intermediate transfer member surface, the jetted ink may be exposed to radiation to a limited extent so as to effect a limited curing of the ink upon the intermediate member surface. This intermediate curing is not to cure the ink to its full extent, but merely to assist in setting the ink up so that it may be transferred to the image receiving substrate with the appropriate amount of penetration, which requires the ink droplets to have a certain rheology before transfer. For controlling the extent of the curing if an intermediate cure is practiced, reference is made to application Ser. No. 11/034,850 entitled "Low Level Cure Transfuse Assist for Printing with Radiation Curable Ink", incorporated herein by reference. This intermediate curing step is not needed; however, as often the gel state is sufficient to impart the desired rheology to the ink droplets.

Following jetting to the intermediate transfer member and optional intermediate curing thereon, the ink is thereafter transferred to an image receiving substrate. The substrate may be any suitable material such as paper, fabric, a transparency, etc., although the ink is most preferably used in forming images on paper. Following transfer to the substrate, the ink is then cured by exposing the image on the substrate to radiation having an appropriate wavelength, mainly the wavelength at which the ink initiator absorbs radiation. This initiates the curing reaction of the ink. The radiation exposure need not be long, and may be for, e.g., about 0.05 to about 10 seconds, more preferably from about 0.2 to about 2 seconds. These exposure times are more often expressed as substrate speeds of the ink passing under a UV lamp. For example, the microwave energized, doped mercury bulbs available from UV Fusion (Gaithersburg, Md.) are placed in an elliptical mirror assembly that is 10 cm wide; multiple units may be placed in series. Thus, a belt speed of 0.1 ms$^{-1}$ would require 1 second for a point of an image to pass under a single unit, while a belt speed 4.0 ms$^{-1}$ would require 0.2 s to pass under four bulb assemblies. The radiation to cure the polymerizable components of the ink is preferably provided by a variety of possible techniques, including but not limited to a xenon lamp, laser light, D or H bulb, etc. The curing light may be filtered, if desired or necessary. The curable components of the ink react to form a cured or crosslinked network of appropriate hardness. Preferably, the curing is substantially complete to complete, i.e., at least 75% of the curable components are cured (reacted and/or crosslinked). This allows the ink to be substantially hardened, and thereby to be much more scratch resistant, and also adequately controls the amount of showthrough on the substrate.

The inks may also undergo an optional heating procedure to treat the ink in an effort to further advance the curing of the ink. This procedure may advantageously be used with cationically cured inks.

In one embodiment, subsequent to placement of the ink image onto the final substrate, either by a direct printing process or by an indirect printing process, the image thus formed is subjected to a temperature high enough to enable thermal curing of the ink but low enough so as to limit ink flow and/or thermal degradation of the ink components. In a specific embodiment, the printing process is a direct printing process, wherein the droplets of the curable inks are ejected directly from the printing apparatus onto the final substrate, followed by heat curing of the image.

In embodiments, the ink is in a gel state in the temperature range used for transfuse. Under these conditions, the ink image can be fused to the final recording substrate with low pile height and minimum showthrough. In another embodiment, the ink is in a gel state in the temperature range used for fusing or post-fusing the image. The fusing and/or transfuse latitude of the ink of the present invention is greatly increased compared to the latitude of conventional wax-based solid inks, since gel inks can be fused over a wider temperature range, typically at all temperatures below the temperature defined as the gel point down, and at lower pressure compared to conventional wax-based inks. On the other hand, waxed-based inks have a sharp melting transition to give low viscosity liquids that penetrate deeply into porous substrates such as paper, producing images with unacceptable showthrough. They cannot be fused at temperatures much above the melting point of the wax, and may require high transfuse pressures to help in fusing the solid wax to the paper. Such pressures, while they can be used with the inks of the present invention, are not needed to produce robust images.

In another embodiment, the recording substrate onto which droplets of the melted ink are ejected in an imagewise pattern, whether it is the final recording substrate (in a direct printing process) or an intermediate transfer member (in an indirect printing process), is maintained at a temperature at which the ink is in the gel state, i.e., at a temperature below the onset of gelation when cooling from the melt or liquid state. Without being limited to any specific theory, it is believed that in this embodiment, the substrate temperature (either the final substrate or the intermediate transfer member) is set at an optimum temperature for the formation of a reinforcing gel network. It is believed that the image thus formed will have improved robustness as a result of the reinforcement of the ink vehicle with the gel. Upon cooling or, in the case of an indirect printing method, transfer to the final substrate, the network is frozen within the ink vehicle.

When an indirect printing process is used, the intermediate transfer member can be of any desired or suitable configuration, such as a drum or roller, a belt or web, a flat surface or platen, or the like. The intermediate transfer member can be heated by any desired or suitable method, such as by situating heaters in or near the intermediate transfer member, or the like. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member, as disclosed in, for example, U.S. Pat. No. 5,389,958. Transfer from the intermediate transfer member to the final recording substrate can be by any desired or suitable method, such as by passing the final recording substrate through a nip formed by the intermediate transfer member and a back member, which can be of any desired or effective configuration, such as a drum or roller, a belt or web, a flat surface or platen, or the like.

The following example inks were prepared to further illustrate embodiments of the invention.

EXAMPLE I

Gelling agent A (a white powder) is synthesized by the addition of methacrylate-functionalized isocyanate to (1R, 2R)-trans-1,2-diaminocyclohexane as described by Esch J. V. et. al. in Chem. Eur. J. 1997, 3, 1238-1243; Gesser H. D. and Goswani, P. C. in Chem. Rev. 1989, 89, 765-788; and Lu X., et al. in Science 1992, 25, 971-972. The properties of "A" are reported by Maaike de Loos et al. in J. Am. Chem. Soc., 1997, 119, 12675-12676.

Gelling Agent A:

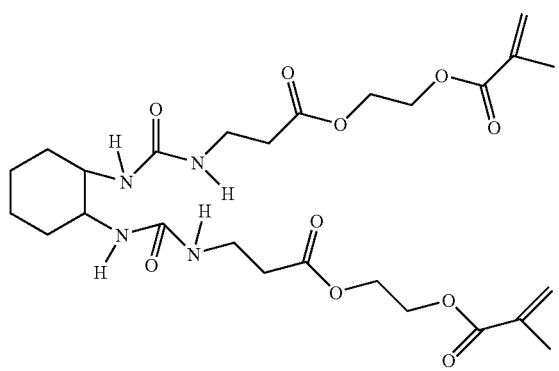

EXAMPLE II

Compound B, a N-acyl-1,ω-amino acid compound, was synthesized as follows: 1.96 g (2 eq) of butyric chloride (Aldrich) was mixed in THF (Aldrich), about 75 ml. To this stirred mixture was added 1.77 g (2.2 eq) triethylamine (Aldrich) and 1.6 g (1 eq) 11-aminodecanoic acid (Aldrich). The reaction product was then first washed with ethyl acetate and 1M HCl solution and then with ethyl acetate and water. The mixture was dried with magnesium sulfate and the solvent removed by rotovap. The product was finally dried under vacuum to yield 1.8 g (90%) of compound B. The structure was verified by $^1$H NMR, the melting point, 73 degree C, was obtained by differential scanning calorimetry.

Compound B:

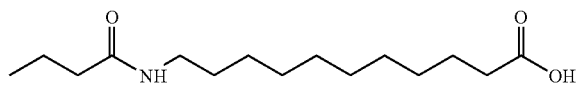

EXAMPLE III 3,4-epoxycyclohexanecarboxylate ester of 2-hexadecyl-1-icosanol was prepared as described in co-pending application Ser. No._____ ("Ink Jet Ink of Functionalized Waxes") Example III:

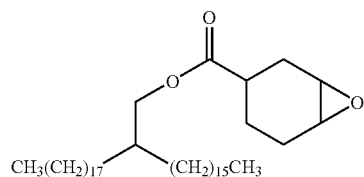

To a 3-neck 100 mL flask equipped with an argon inlet, stir bar and distillation apparatus was added 2-hexadecyl-1-icosanol (5.02 g, 9.6 mmol, obtained from Tomah Products, Inc.), methyl 3,4-epoxycyclohexanecarboxylate (ERL-4140, 4.81 g, 31 mmol, obtained from Dow Chemical Company), 1,4-diazabicyclo[2.2.2]octane (DABCO™, 0.56 g, 5.0 mmol, obtained from Sigma-Aldrich) and toluene (15 mL). The reaction mixture was refluxed until methanol ceased collecting in the receiving flask and the completion of the reaction was confirmed by $^1$H NMR spectroscopy. The still pot from the distillation was diluted with toluene (15 mL) and washed with brine (3×15 mL); The organic layer was separated, dried over MgSO$_4$ and filtered. The solvent was removed in vacuo. The excess methyl 3,4-epoxycyclohexane carboxylate was removed via Kugelrohr distillation under reduced vacuum to give 5.45 g (88%) of a sticky, waxy white solid of 3,4-epoxycyclohexanecarboxylate ester of 2-hexadecyl-1-icosanol. $^1$H NMR (CDCl$_3$, δ): 4.00 (dd, J=5.6, 2.2 Hz, 2H), 3.26-3.18 (m, 2H), 2.60-2.45 (m, 1H), 2.33-1.22 (m, 71H), 0.90 (t, J=6.7 Hz, 6H).

EXAMPLE IV

A curable ink formulation is prepared as follows: Gelling agent A (4.5% by weight of the final ink) is dissolved in a mixture, held at about 85° C., composed of isodecyl acrylate (Sartomer SR395) (34% by weight), pentaerythritol tetraacrylate (Sartomer SR 494) (3% by weight) and dipropoxylated neopentyl glycol diacrylate (Sartomer SR9003) (23.5% by weight), a thermal solvent of 1,12 dodecanediol (mp=81-84° C.) (30% by weight), a colorant of Solvent Blue 37 (Keystone Aniline Corp.) (2% by weight of the final ink), and an initiator of Irgacure 369 (Ciba) (1.0% by weight) and Irgacure 907 (Ciba) (2.0% by weight).

The resulting ink is filtered through a heated MOTT® apparatus (obtained from Mott Metallurgical) using #3 Whatman filter paper and a pressure of about 15 pounds per square ink. It is believed that the filtered ink will have a viscosity of about 8 to 13 cps at a jetting temperature of about 85° C.

EXAMPLE V

A curable ink formulation is prepared as follows: Gelling agent A (4% by weight of the final ink) is dissolved in a mixture, held at about 85° C., composed of alkoxylated tetrahydrofurfuryl acrylate (Sartomer CD611) (28% by weight), isodecyl acrylate (Sartomer SR395) (24% by weight) and trifunctional polyether acrylate (Laromer PO 43 F, BASF) (7% by weight), a thermal solvent of 1,10 decanediol (mp=72° C.) (30% by weight), a colorant of polymeric dispersant modified Pigment Blue 15:4 (Sun Chemicals) (4% by weight), and two initiators of Irgacure 369 (Ciba) (1.0% by weight) and Irgacure 907 (Ciba) (2.0% by weight).

The resulting ink is filtered through a heated MOTT® apparatus (obtained from Mott Metallurgical) using #3 Whatman filter paper and a pressure of about 15 pounds per square ink. It is believed that the filtered ink will have a viscosity of about 8 to 13 cps at a jetting temperature of about 85° C.

EXAMPLE VI

A curable ink formulation is prepared as follows: Gelling agent A (2% by weight of the final ink) and compound B of Example II (2% by weight of the final ink) are dissolved in a mixture, held at about 85° C., composed of alkoxylated tetrahydrofurfuryl acrylate (Sartomer CD611) (28% by weight), isodecyl acrylate (Sartomer SR395) (24% by weight) and trifunctional polyether acrylate (Laromer PO 43 F, BASF) (7% by weight), a thermal solvent of 1,10 decanediol (mp=72° C.) (30% by weight), a colorant of polymeric dispersant modified Pigment Blue 15:4 (Sun Chemicals) (4% by weight), and two initiators of Irgacure 369 (Ciba) (1.0% by weight) and Irgacure 907 (Ciba) (2.0% by weight).

The resulting ink is filtered through a heated MOTT® apparatus (obtained from Mott Metallurgical) using #3 Whatman filter paper and a pressure of about 15 pounds per square ink. It is believed that the filtered ink will have a viscosity of about 8 to 13 cps at a jetting temperature of about 85° C.

EXAMPLE VII

A cationically curable ink formulation is prepared as follows: 3,4-epoxycyclohexanecarboxylate ester of 2-hexadecyl-1-icosanol as per Example III (1.5% by weight of the total ink) and compound B of Example II (2.5% by weight of the final ink) are dissolved in a mixture of bis-(3,4-epoxycyclohexylmethyl)adipate (Dow UVR-6128) (28% by weight) and epoxidized propylene glycol dioleate (Atofina Vikoflex 5075) (33.5% by weight), a thermal solvent of 1,10 decanediol (mp=72° C.) (30% by weight), a colorant of Solvent Blue 37 (Keystone Aniline Corp.) (2% by weight) and an initiator of arylsulfonium hexafluorophosphate salt (Dow UVI-6992) (2.5% by weight).

The resulting ink is filtered through a heated MOTT® apparatus (obtained from Mott Metallurgical) using #3 Whatman filter paper and a pressure of about 15 pounds per square ink. It is believed that the filtered ink will have a viscosity of about 8 to 13 cps at a jetting temperature of about 85° C.

EXAMPLE VIII

A curable ink formulation is prepared as follows: Gelling agent (4% by weight):

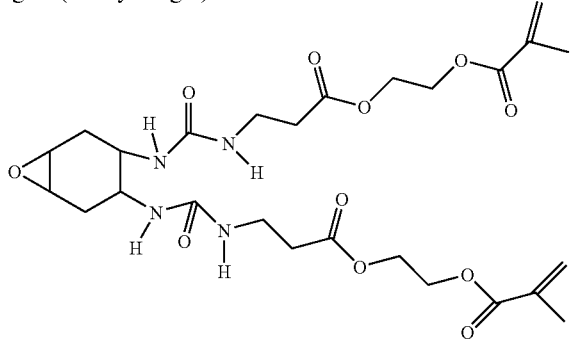

is dissolved in a mixture of bis-(3,4-epoxycyclohexylmethyl-3,4-epoxycyclohexane carboxylate) (Dow UVR-6110) (34% by weight), triethyleneglycol divinyl ether (DVE-3 BASF) (18% by weight) and 1-(ethenyloxy)-dodecyl alcohol (DDVE, ISP) (8% by weight), a thermal solvent of 1,10 decanediol (mp=72° C.) (30% by weight), a colorant of Solvent Blue 37 (Keystone Aniline Corp.) (2% by weight), and an initiator of arylsulfonium hexafluorophosphate salt (Dow UVI-6992) (2.5% by weight).

The resulting ink is filtered through a heated MOTT® apparatus (obtained from Mott Metallurgical) using #3 Whatman filter paper and a pressure of about 15 pounds per square ink. It is believed that the filtered ink will have a viscosity of about 8 to 13 cps at a jetting temperature of about 85° C.

EXAMPLE IX

A curable ink formulation is prepared as follows: Gelling agent A (4.5% by weight of the final ink) is dissolved in a mixture, held at about 55° C., composed of isodecyl acrylate (Sartomer SR395) (44% by weight), Ebycryl 812 (a polyester acrylate oligomer available from UCB Chemical Corp, Smyrna, Ga.) (20% by weight), pentaerythritol tetraacrylate (Sartomer SR 494) (3% by weight) and dipropoxylated neopentyl glycol diacrylate (Sartomer SR9003) (23.5% by weight), a colorant of Solvent Blue 37 (Keystone Aniline Corp.) (2% by weight of the final ink), and initiators of Irgacure 369 (Ciba) (1.0% by weight) and Irgacure 907 (Ciba) (2.0% by weight).

The resulting ink is filtered through a heated MOTT® apparatus (obtained from Mott Metallurgical) using #3 Whatman filter paper and a pressure of about 15 pounds per square ink. It is believed that the filtered ink will have a viscosity of about 8 to 13 cps at a jetting temperature of about 85° C.

While the inks have been described in conjunction with specific embodiments described above, it is evident that many alternatives, modifications and variations will be apparent to those skilled in the art. Accordingly, the preferred embodiments, as set forth above, are intended to be illustrative and not limiting. Various changes may be made without departing from the spirit and scope of the inks described herein.

What is claimed is:

1. An ink comprising an ink vehicle that includes at least one curable monomer, at least one polymerizable organic gelator, at least one photoinitiator, and at least one colorant;

wherein the polymerizable organic gelator is selected from among

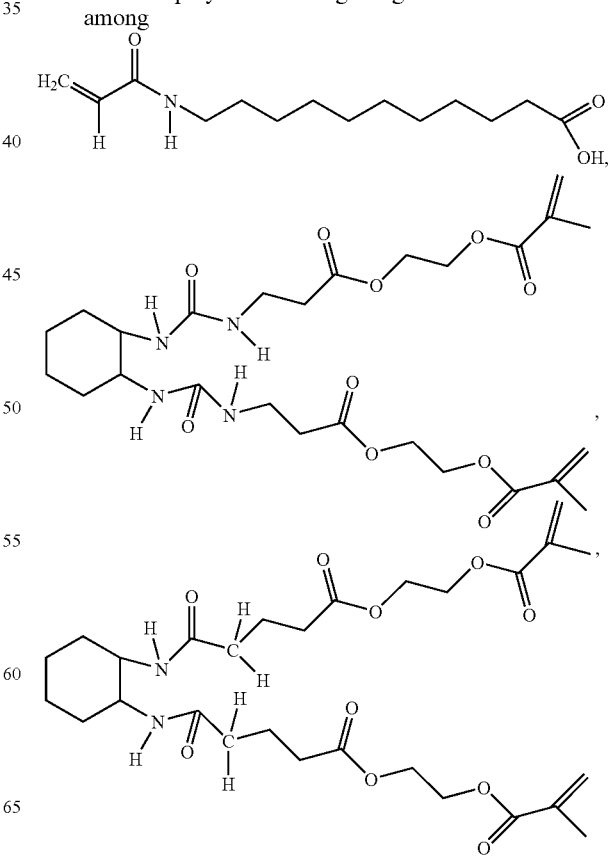

-continued

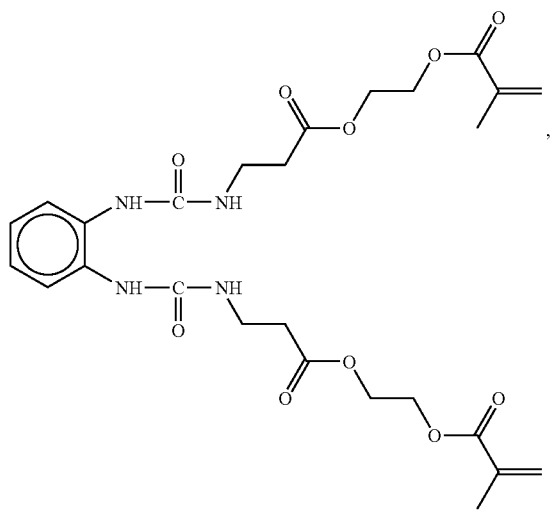

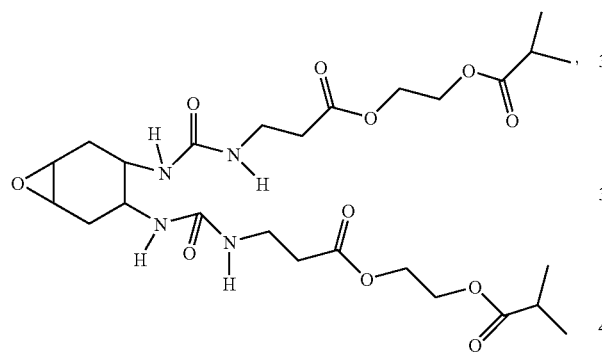

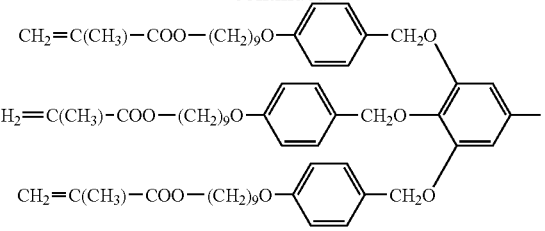

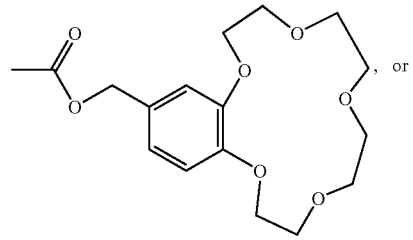

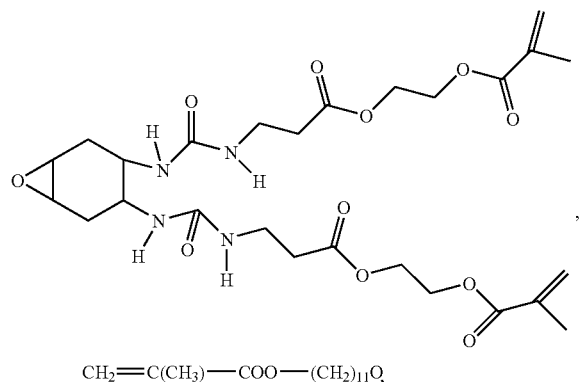

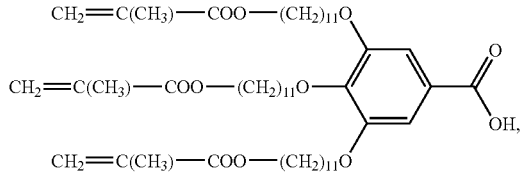

2. The ink according to claim 1, wherein the ink forms a gel state having a viscosity of at least $10^{2.5}$ cps.

3. The ink according to claim 2, wherein the gel state is formed at temperatures between about 30° C. to about 50° C.

4. The ink according to claim 1, wherein the ink has an elastic modulus of at least about $10^3$ dynes/cm in the temperature range of 30° C. to 50° C.

5. The ink according to claim 1, wherein the ink has a viscosity of about 5 to about 20 cps at temperatures of from about 50° C. to about 90° C.

6. The ink according to claim 1, wherein the ink has a viscosity of about 5 to about 13 cps at temperatures of from about 50° C. to about 90° C.

7. The ink according to claim 1, wherein the polymerizable organic gelator is selected from among functional N-acyl-1, ω-amino acid derivatives, di-functional (1R,2R)-trans-1,2-bis(ureido) cyclohexane derivatives or difunctional ortho bis (ureido) benzene derivatives.

8. An ink comprising an ink vehicle that includes at least one curable monomer, at least one polymerizable organic gelator, at least one photoinitiator, and at least one colorant;
wherein the polymerizable organic gelator is selected from among the following compounds, each modified to include at least one curable group:
ureidopyrimidone,

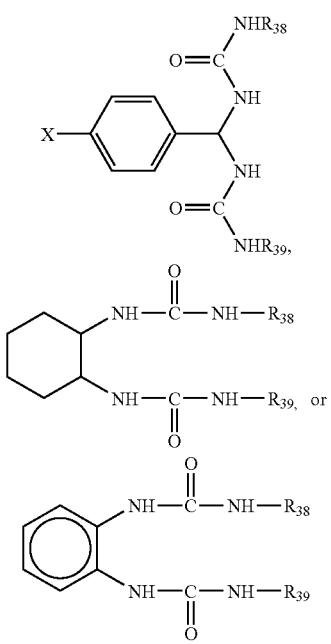
wherein X is a hydrogen atom, a halogen atom, a nitro group, an alkoxy group of the formula —$OR_{50}$, or an amino group of the formula —$NR_{91}R_{92}$, and wherein $R_{38}$, $R_{39}$, $R_{50}$, $R_{91}$, and $R_{92}$ each, independently of the other, is hydrogen atom, an alkyl group, an aryl group, an arylalkyl group, or an alkylaryl group;
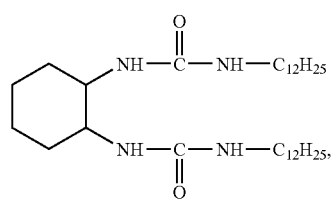
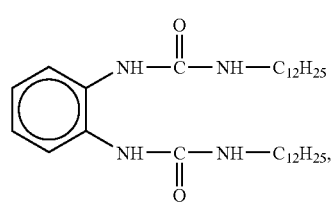
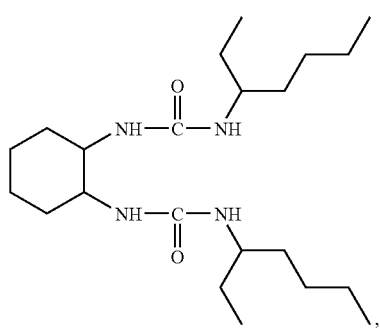
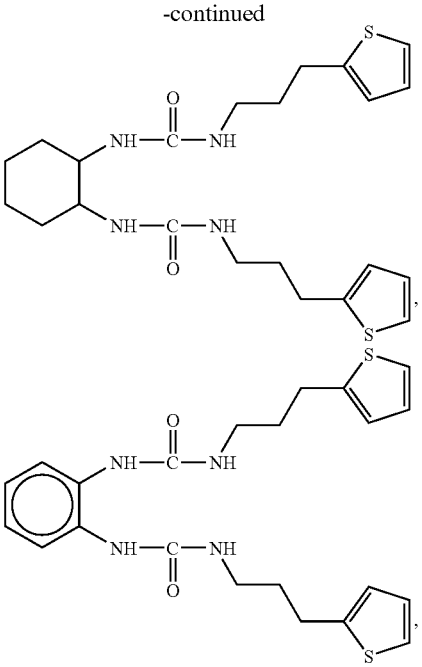
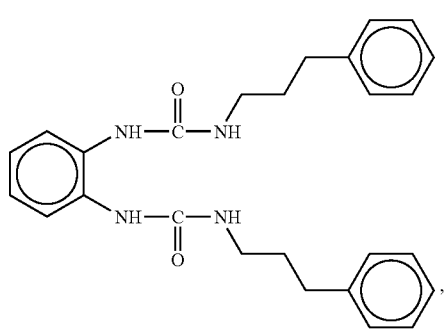
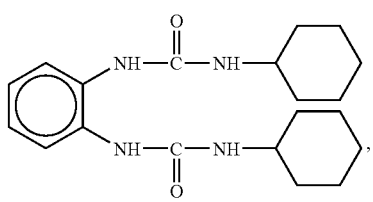
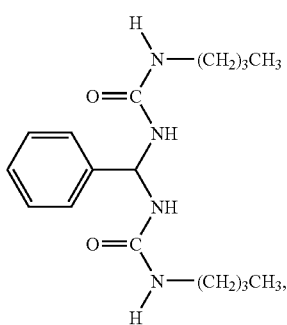

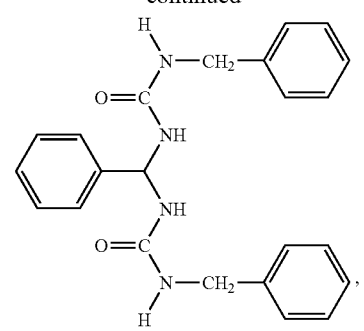
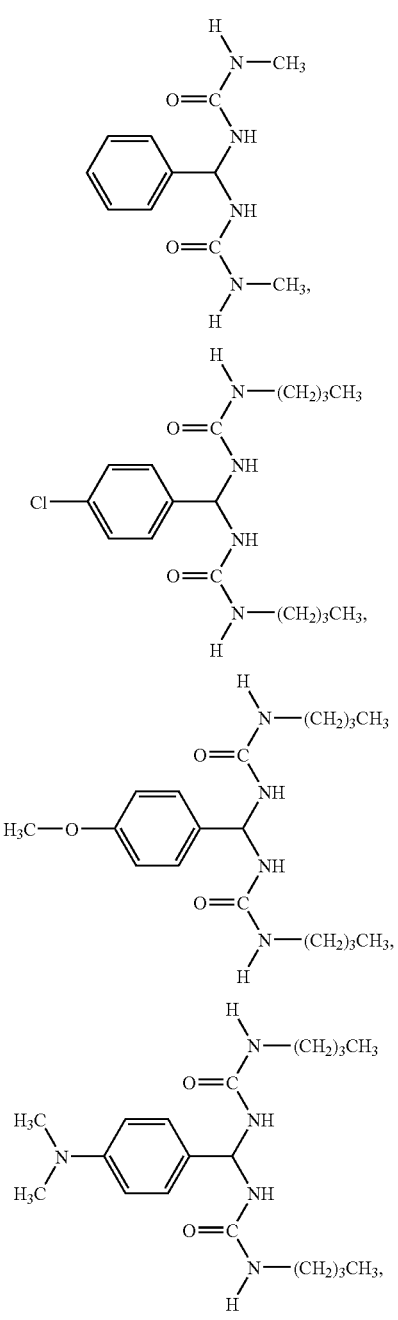
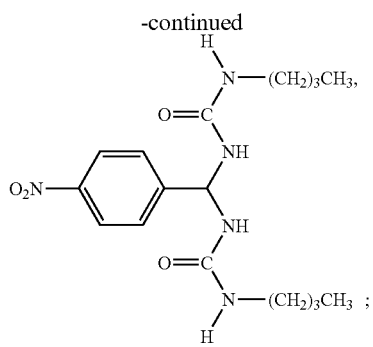
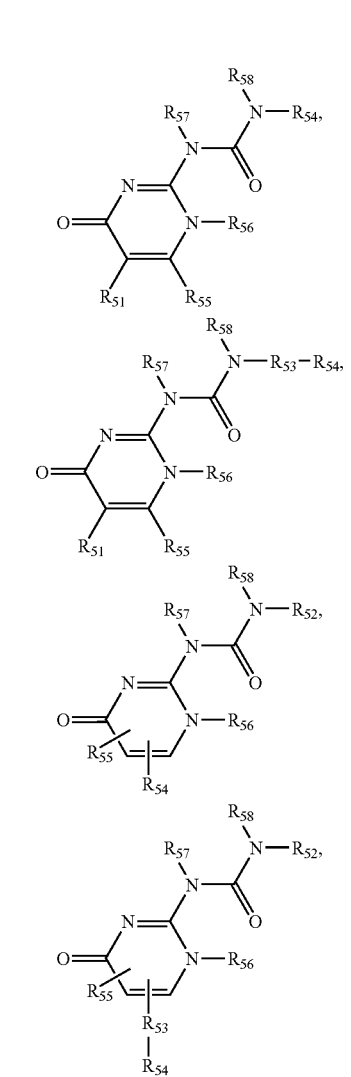
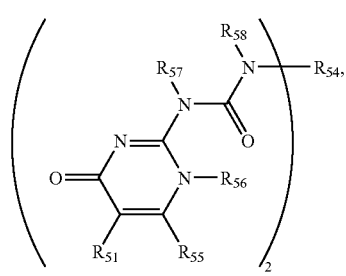

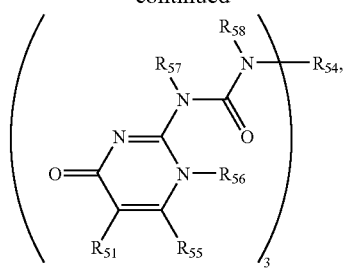
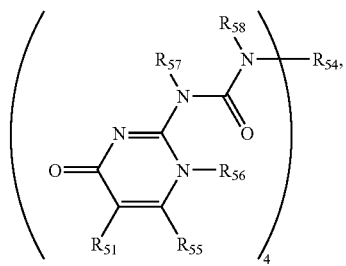
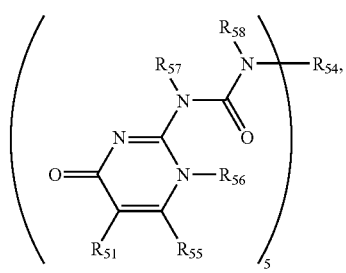
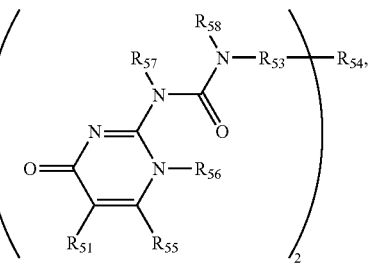
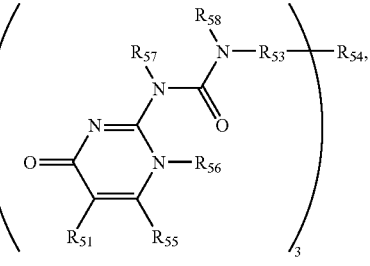
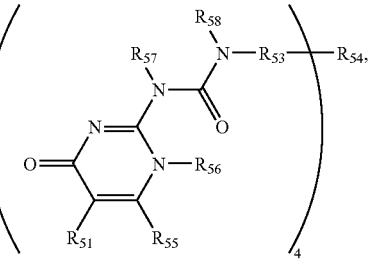
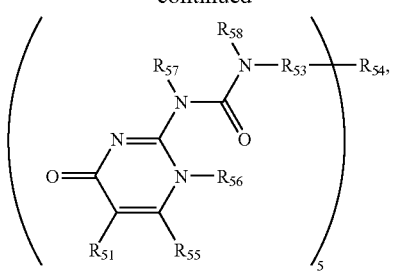
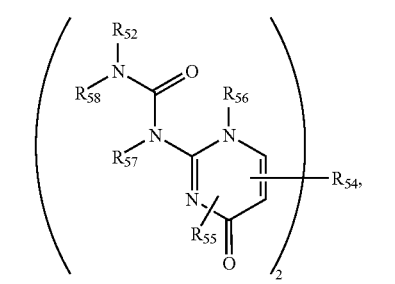
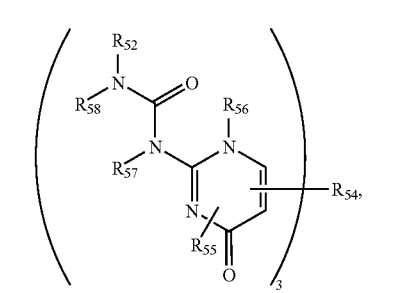
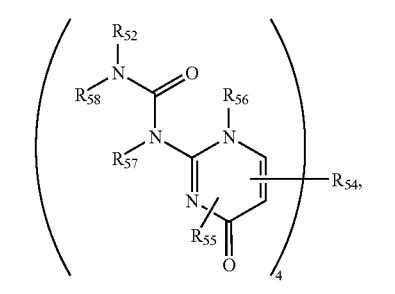
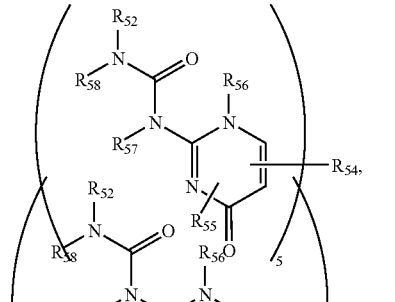

-continued

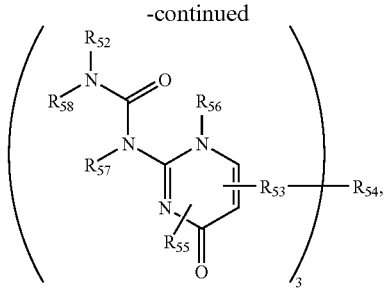

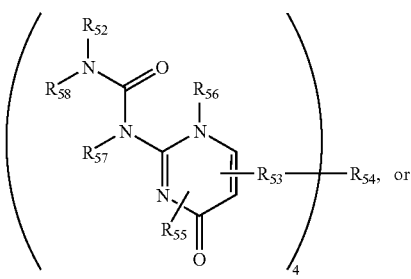

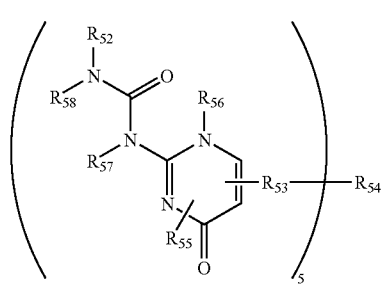

wherein, provided that at least one of $R_{52}$, $R_{56}$, $R_{97}$, and $R_{58}$ is a hydrogen atom, $R_{51}$, $R_{52}$, $R_{55}$, $R_{56}$, $R_{57}$, and $R_{58}$ each, independently of the other, is a hydrogen atom, an alkyl group, an aryl group, an arylalkyl group, or an alkylaryl group, $R_{53}$ is an alkylene group, an arylene group, an arylalkylene group, an alkylarylene group, an alkyleneoxy group, an aryleneoxy group, an arylalkyleneoxy group, an alkylaryleneoxy group, a polyalkyleneoxy group, a polyaryleneoxy group, a polyarylalkyleneoxy group, or a polyalkylaryleneoxy group, and $R_{54}$ is an alkyl or alkylene group, an aryl or arylene group, an arylalkyl or arylalkylene group, an alkylaryl or alkylarylene group, an alkoxy or alkyleneoxy group, an aryloxy or aryleneoxy group, an arylalkyloxy or arylalkyleneoxy group, an alkylaryloxy or alkylaryleneoxy group, a polyalkyleneoxy group, a polyaryleneoxy group, a polyarylalkyleneoxy group, a polyalkylaryleneoxy group, a silyl or silylene group, a siloxane group, a polysilylene group, or a polysiloxane group;

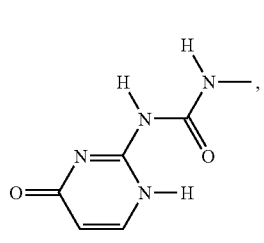

-continued

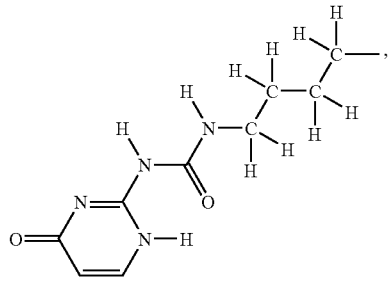

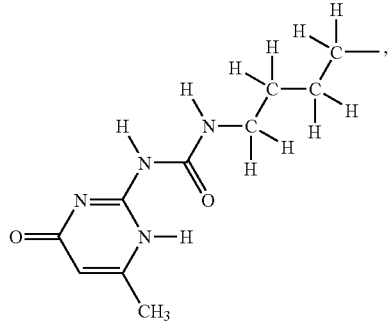

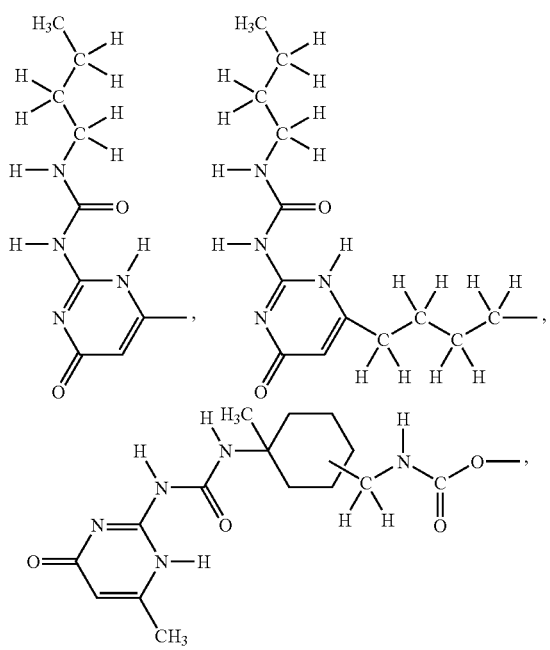

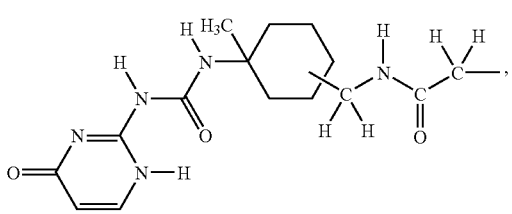

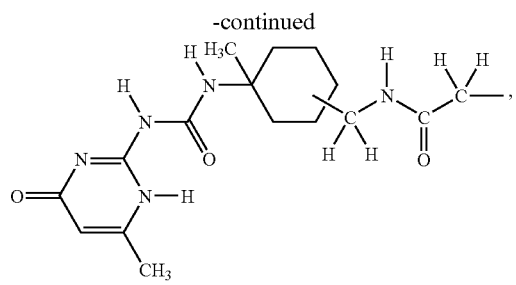
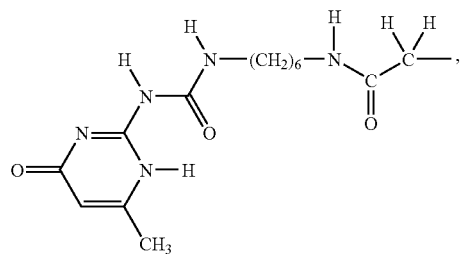
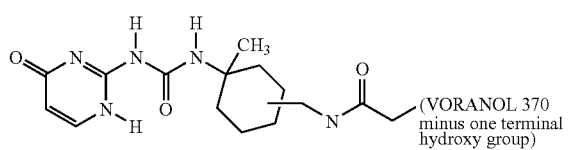
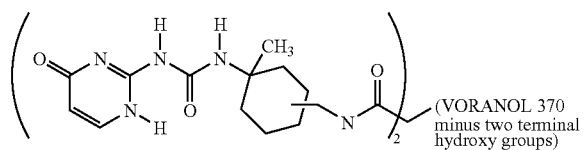
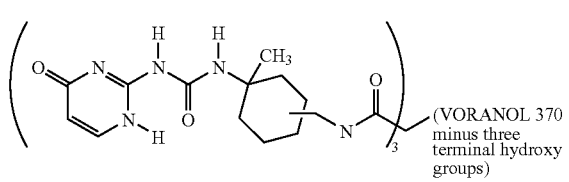
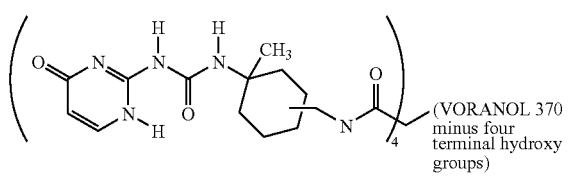
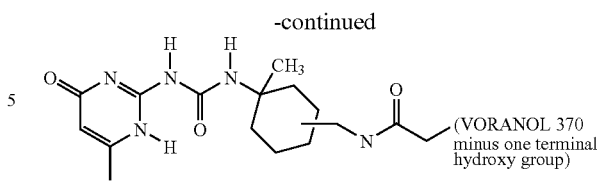
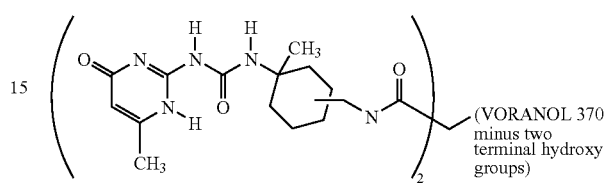
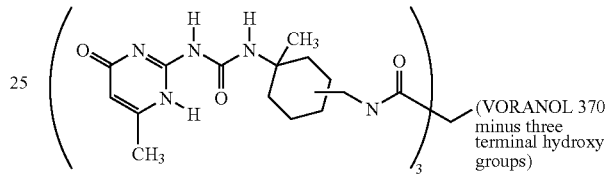
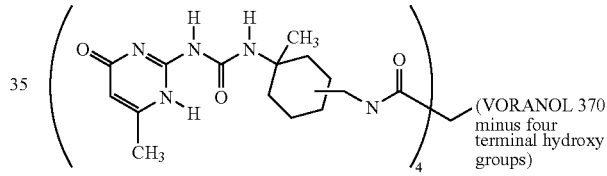
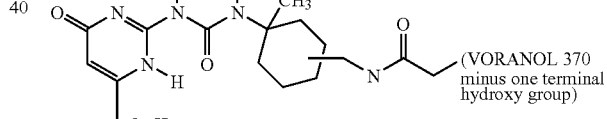
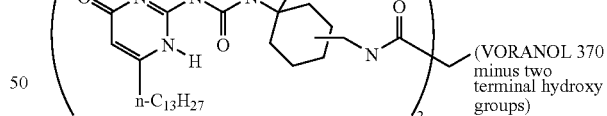
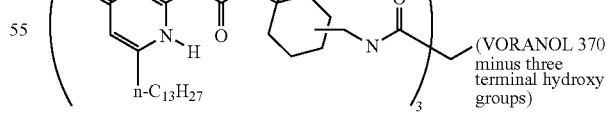
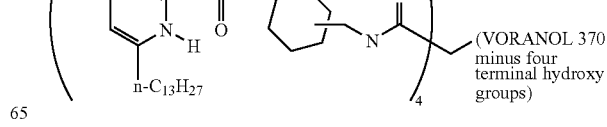

wherein VORANOL™ 370
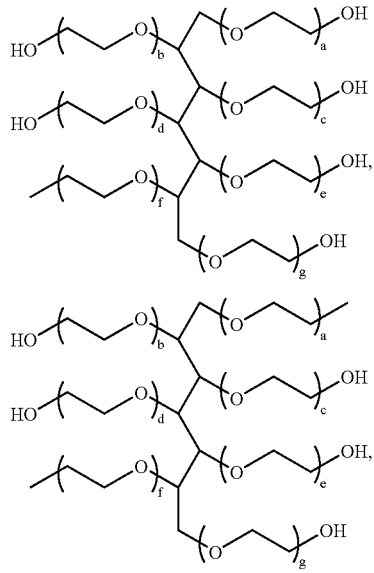
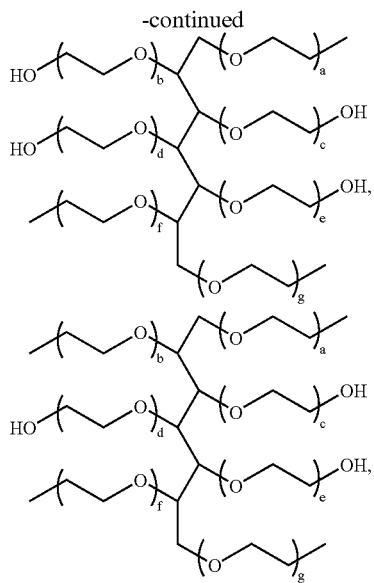
wherein a, b, c, d, e, f, and g are each integers representing the number of ethylene oxide repeat units and the molecular weight of the starting material (wherein all end groups are terminated by hydroxy groups) is about 1,040;
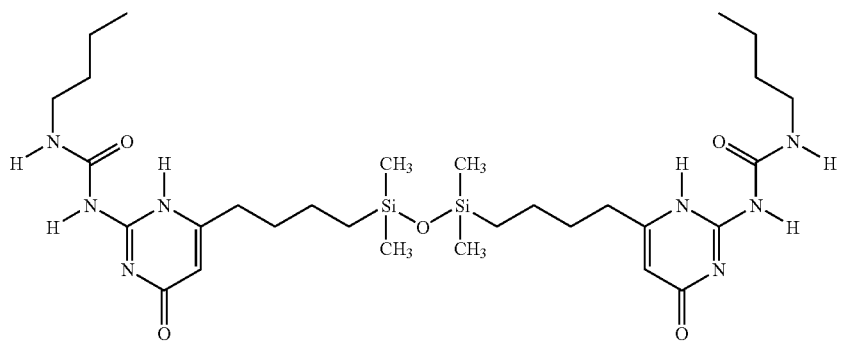
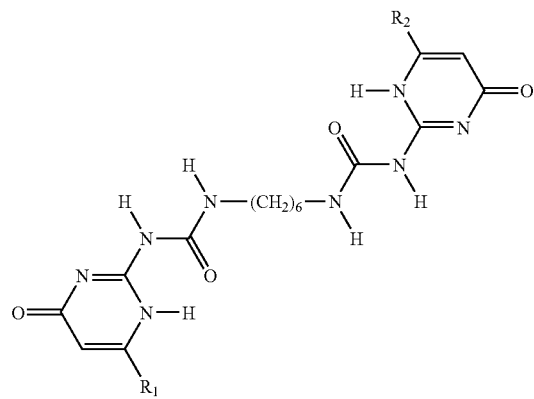

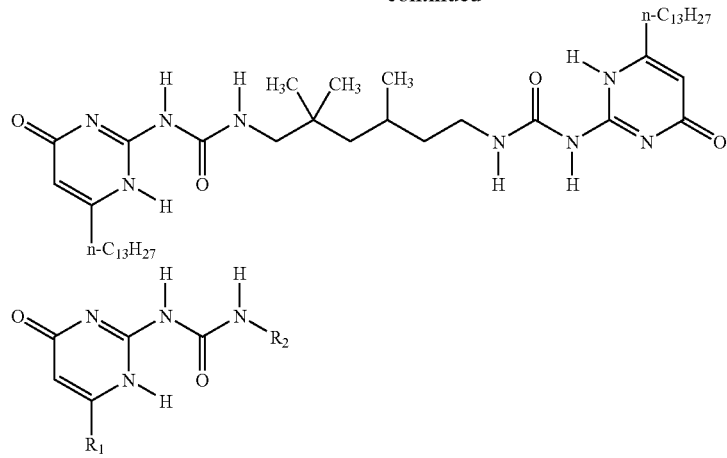

wherein $R_1$ and $R_2$ each, independently of the other, is an alkyl group with from 1 to about 18 carbon atoms.

9. The ink according to claim 1, wherein the polymerizable organic gelator is present in an amount of from about 1 to about 20% by weight of the ink.

10. The ink according to claim 1, wherein the ink further comprises a reactive diluent comprised of a polymerizable monomer or oligomer.

11. The ink according to claim 10, wherein the reactive diluent is selected from among cycloaliphatic epoxides,

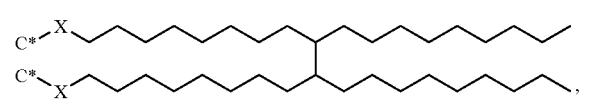

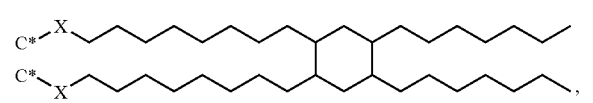

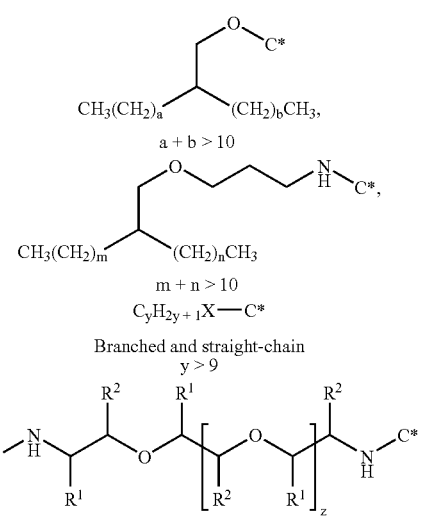

wherein in the foregoing, X is O or NH and C* is

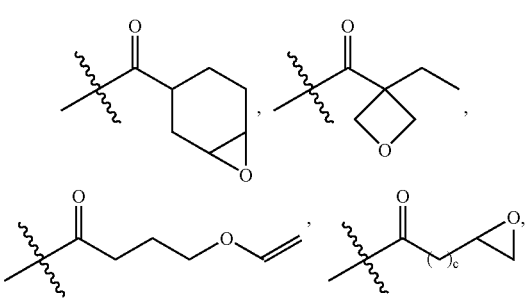

isobornyl (meth)acrylate, lauryl (meth)acrylate, isodecy (meth)acrylate, isooctyl(meth)acrylate, butyl acrylate, pentaerytritol tetra(meth)acrylate, 1,2 ethylene glycol di(meth)acrylate, 1,6 hexanediol di(meth)acrylate, 1,12-dodecanol di(meth)acrylate, propoxylated neopentyl glycol diacrylate, hexanediol diacrylate, tripropylene glycol diacrylate, dipropylene glycol diacrylate, amine modified polyether acrylates, trimethylolpropane triacrylate, glycerol propoxylate triacrylate, dipentaerythritol penta-/hexa-acrylate, and ethoxylated pentaerythritol tetraacrylate.

12. The ink according to claim 10, wherein the reactive diluent is added to the ink in amounts of from about 10 to about 60% by weight of the ink.

13. The ink according to claim 1, wherein the at least one colorant is a dye, a pigment, or a mixture thereof.

14. The ink according to claim 1, wherein the ink further comprises at least one thermal solvent selected from among polyols, sulfonamides, urea, ethyl urea, ethylene carbonate, tetrahydro-thiophene-1,1-dioxide, methyl anisate, bifunctional fatty alcohols, pyridine N-oxide, acetamide, acrylamide, sulfamide, maleimide, pyrazole or imidazole.

15. The ink according to claim 1, wherein the ink further comprises at least one non-reactive organogelator.

16. The ink according to claim 15, wherein the nonreactive organogelator is an N-acyl-1,ω-amino acid derivative.

17. The ink according to claim 16, wherein the N-acyl-1,ω-amino acid derivative is:

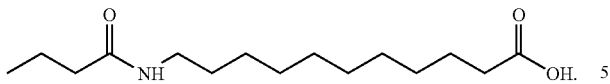

18. A method of forming an image, comprising
heating an ink to a first temperature, wherein the ink comprises an ink vehicle that includes at least one curable monomer, at least one polymerizable organic gelator, at least one initiator, at least one colorant, and optionally at least one heat solvent and wherein the first temperature is above the gel point of the ink;
jetting the heated ink onto an intermediate transfer member surface, wherein the intermediate transfer member surface is maintained at a second temperature at which the ink forms a gel state;
subsequently transferring the ink from the intermediate transfer member surface to an image receiving substrate; and
exposing the ink on the image receiving substrate to radiation energy to initiate polymerization of the polymerizable components of the ink.

19. The method according to claim 18, wherein the first temperature is from about 50 to about 90° C. and the second temperature is from about 30 to about 50° C.

20. The method according to claim 18, wherein the ink forms a gel state upon the intermediate transfer member surface, the ink viscosity in the gel state increasing at least about $10^{2.5}$ times a viscosity of the ink at the first temperature.

21. A method of forming an image, comprising
heating an ink to a first temperature, wherein the ink comprises an ink vehicle that includes at least one curable monomer, at least one polymerizable organic gelator, at least one initiator, at least one colorant, and optionally at least one heat solvent and wherein the first temperature is above the gel point of the ink;
jetting the heated ink directly onto an image receiving substrate in which at least the surface is maintained at a second temperature at which the ink forms a gel state; and
exposing the ink on the image receiving substrate to radiation energy to initiate polymerization of the polymerizable components of the ink.

22. The method according to claim 21, wherein the first temperature is from about 50 to about 90° C. and the second temperature is from about 30 to about 50° C.

23. The method according to claim 21, wherein the ink forms a gel state on the image receiving substrate, the ink viscosity in the gel state increasing at least about $10^{2.5}$ times a viscosity of the ink at the first temperature.

24. An ink comprising an ink vehicle that includes at least one curable monomer, at least one polymerizable organic gelator, at least one photoinitiator, and at least one colorant, wherein the ink further comprises at least one nonreactive organogelator.

25. The ink according to claim 24, wherein the non-reactive organogelator is an N-acyl-1,ω-amino acid derivative.

26. The ink according to claim 25, wherein the N-acyl-l,ω-amino acid derivative is:

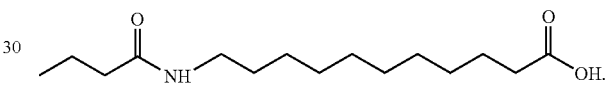

* * * * *